United States Patent [19]

Aronson et al.

[11] Patent Number: 4,488,237
[45] Date of Patent: Dec. 11, 1984

[54] TWO DIMENSIONAL PRESS BRAKE CONTROL SYSTEM AND APPARATUS

[75] Inventors: Herbert L. Aronson, Newton; Sidney A. Wingate, Concord; William L. Cotter, Salem; Richard A. Brisk, Wayland, all of Mass.

[73] Assignee: Dynamics Research Corporation, Wilmington, Mass.

[21] Appl. No.: 373,148

[22] Filed: Apr. 29, 1982

[51] Int. Cl.³ ............................................. B21J 9/20
[52] U.S. Cl. .................................. 364/476; 364/142; 364/167; 364/174; 364/603; 72/6; 72/7; 72/8; 72/36; 72/380; 72/461; 340/825.03; 340/825.04; 340/825.05; 340/825.5; 377/17; 250/231 SE; 33/125 C
[58] Field of Search ............... 364/142, 476, 167, 174, 364/603; 356/395; 377/3, 17, 18; 250/231 SE; 72/6, 7, 8, 21, 31, 35, 36, 37, 380, 386, 419, 420, 461; 33/125 C; 340/825.03, 825.04, 825.05, 825.5

[56] References Cited

U.S. PATENT DOCUMENTS

| | | | |
|---|---|---|---|
| 3,805,234 | 4/1974 | Masters | 371/34 |
| 3,816,727 | 6/1974 | McCann | 371/34 |
| 3,910,322 | 10/1975 | Hardesty, Jr. et al. | 371/34 X |
| 3,917,930 | 11/1975 | Davey et al. | 364/167 X |
| 3,995,258 | 11/1976 | Barlow | 371/34 X |
| 4,040,014 | 8/1977 | Gehrking | 340/825.5 |
| 4,115,849 | 9/1978 | Johnson et al. | 340/825.03 |
| 4,115,859 | 9/1978 | Brisk et al. | 364/142 X |
| 4,123,750 | 10/1978 | Leney et al. | 364/167 X |
| 4,148,203 | 4/1979 | Farazandeh et al. | 72/21 |
| 4,211,098 | 7/1980 | Luenser | 72/21 |
| 4,225,931 | 9/1980 | Schwefel | 377/3 X |
| 4,245,297 | 1/1981 | Bertram | 364/167 |
| 4,254,401 | 3/1981 | Murano et al. | 340/825.03 |
| 4,272,818 | 6/1981 | McDaniel | 364/167 |
| 4,281,380 | 7/1981 | DeMusa et al. | 340/825.5 X |
| 4,295,122 | 10/1981 | Hatada et al. | 340/825.5 |
| 4,312,033 | 1/1982 | Sweeney et al. | 364/167 |
| 4,375,639 | 3/1983 | Johnson, Jr. | 340/825.5 |

Primary Examiner—Jerry Smith
Assistant Examiner—Allen MacDonald
Attorney, Agent, or Firm—Weingarten, Schurgin, Gagnebin & Hayes

[57] ABSTRACT

A press brake control system and apparatus including a vertical ram extension controller and back gauge system which together determine respectively the angle and location of successive sheet metal bends according to a stored operating sequence. The control system and apparatus is attached to an existing and unmodified press brake to which the press brake control system automatically adapts its control functions according to the mechanical parameters and conditions of the particular press brake. Futhermore, the press brake control system elements communicate according to a communication system having redundancy and error-checking features to be operable in hostile electrical and physical environments.

25 Claims, 36 Drawing Figures

COMMUNICATIONS-INTERRUPT SERVICE, ENTRY AND EXIT CONTROL
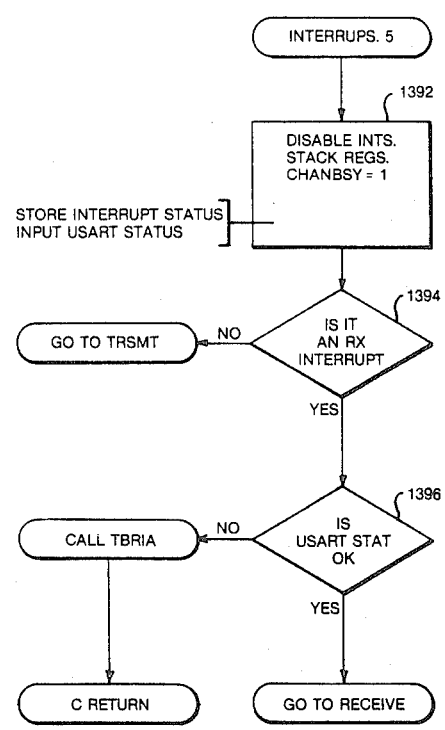
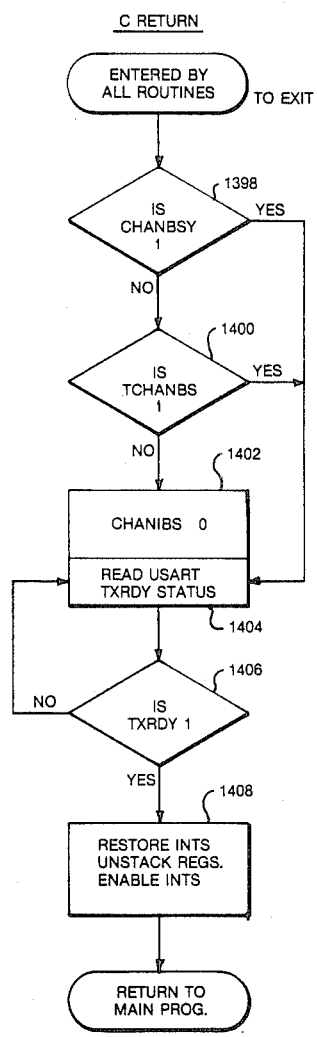
Fig. 17
Fig. 18

COMMUNICATIONS-SLAVE SUBROUTINES
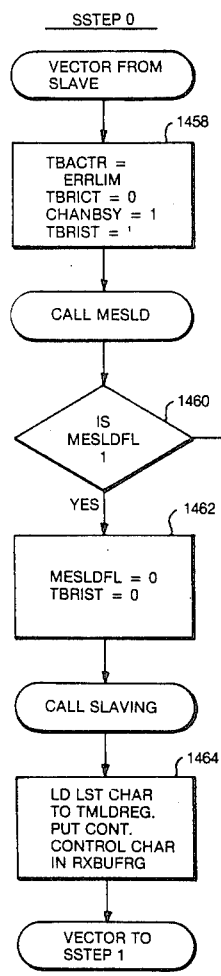
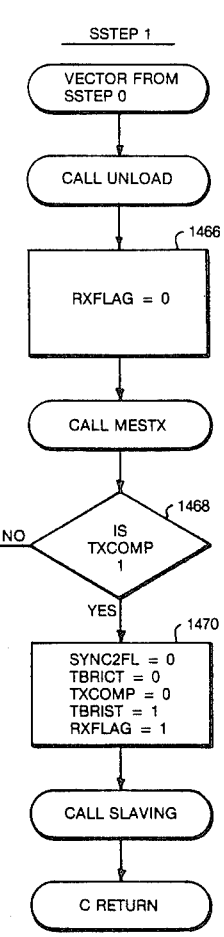
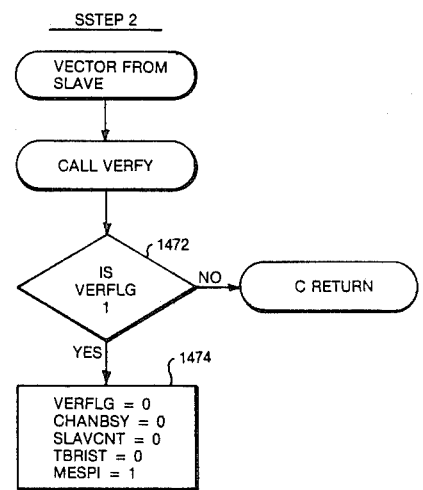
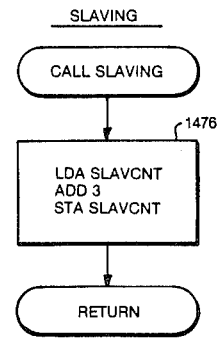
Fig. 21   Fig. 22   Fig. 23A COMMUNICATIONS-MASTER SUBROUTINES 2
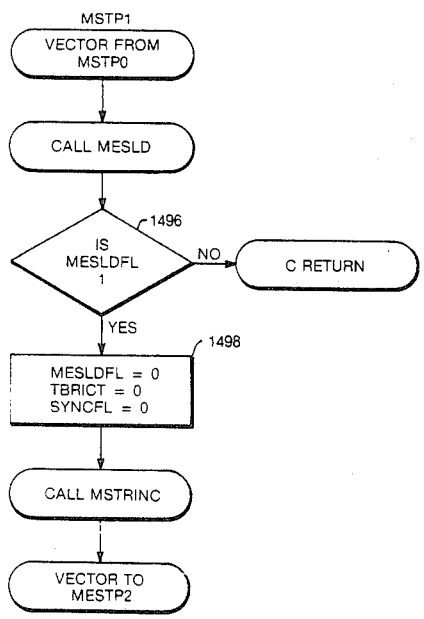
Fig. 26
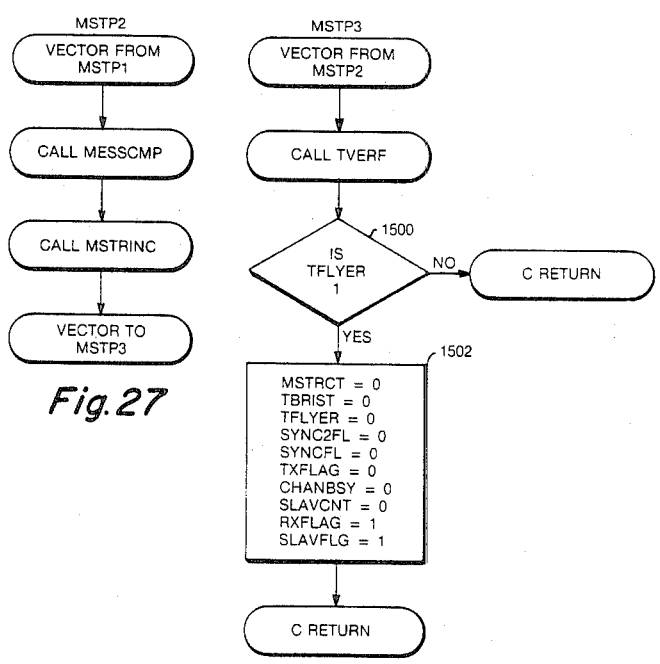
Fig. 27
Fig. 28

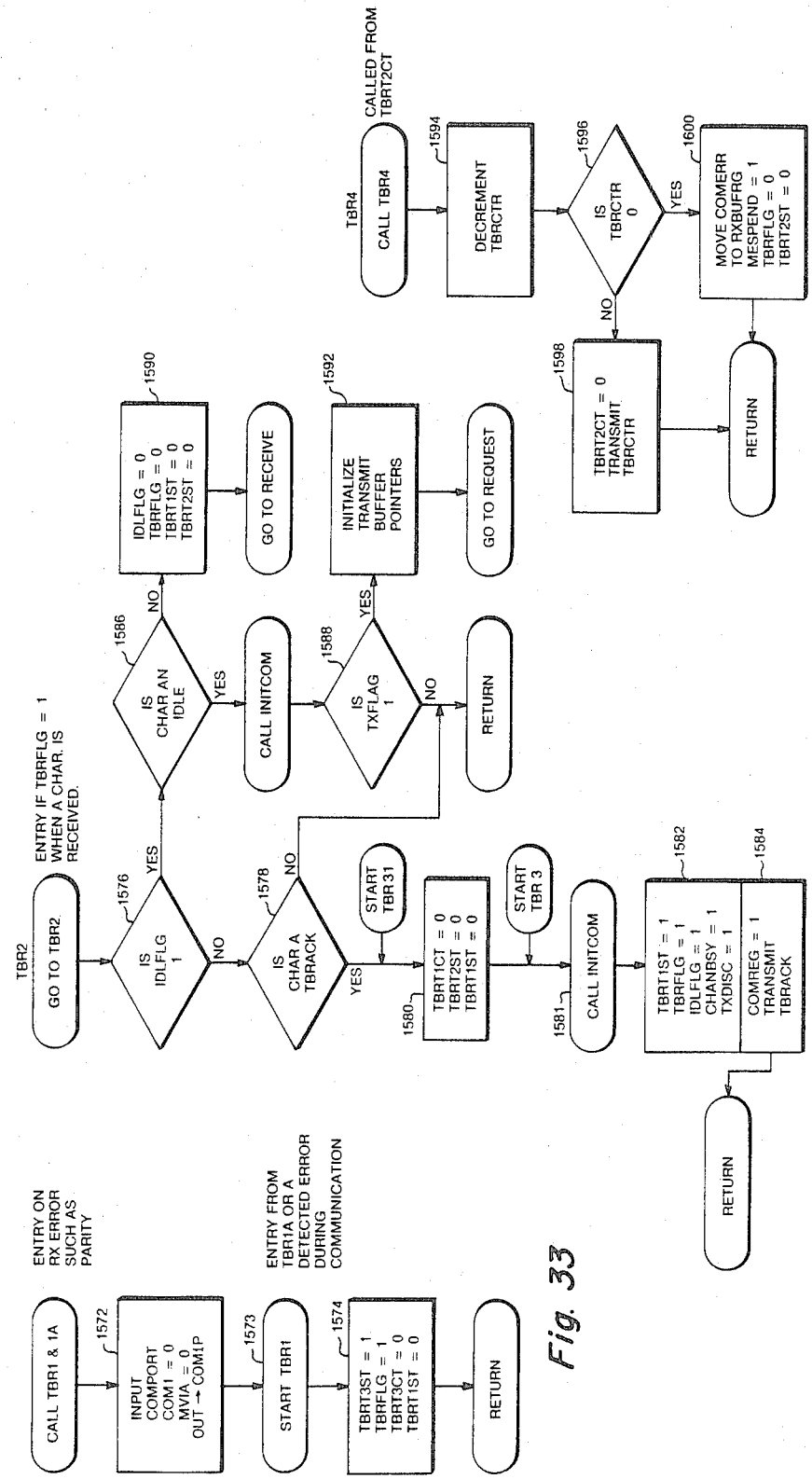

TWO DIMENSIONAL PRESS BRAKE CONTROL SYSTEM AND APPARATUS

FIELD OF THE INVENTION

The present invention relates to press brake apparatus and more particularly to press brake back gauge and ram control systems and apparatus.

BACKGROUND OF THE INVENTION

In the art of sheet metal work, it is frequently necessary to provide a sequence of precision bends according to a predetermined bend angle and position. A preferred manner of bending sheet metal provides the use of a two-piece metal die having complementary surfaces, wherein the sheet metal to be bent is inserted between the two die pieces which are driven together. The sheet metal bend is formed according to the shape of the interface surface between the two die pieces and the extent to which the two die pieces are driven together. While it is possible to configure the die pieces in a variety of bending shapes, for the purpose of the discussion here, the cross-section of the die piece interace will be assumed to be a V-shape: that is, the lower piece to be a V-groove (die) and the upper piece to be a complement of the V-groove (punch) fitting within the lower piece and the sheet metal to be placed therebetween.

The apparatus used to move the die or punch can include pneumatic, hydraulic or mechanical apparatus. The pneumatic and hydraulic devices are pistons actuated by valves in the pneumatic or fluid lines. The mechanical apparatus typically include a two-part mechanical actuating device attached to the upper punch piece, having an adjustable extension where the extension piece may be moved over several inches as desired, and a cyclical eccentric which is attached to the upper die piece through the extension piece. The eccentric rotates through one complete cycle having a predetermined and fixed motion sequence. The sum of the extension position, the eccentric motion and the thickness of the sheet metal to be bent must be exceed the distance to the lower die surface (usually fixed) to prevent the risk of fracturing the die pieces.

Furthermore it is generally known within the art of metal bending to form a smaller bend (at an angle greater than the apex angle of the V-groove) by limiting the downward extension of the die to less than the total distance necessary to achieve complete contact of the two die pieces on both sides of the metal to be bent. This technique is known as air-bending.

In the operation of the above-described metal bending apparatus, or press brake, there exists a need for great accuracy in the control of the die motion. This means the allowable error is typically in the neighborhood of several thousandths of an inch of displacement. Furthermore, in mass production operations, this precision control must be maintained and repeated throughout the sequence of bend operations to be performed.

Moreover, there exists a great number of manually or partially automated press brake machinery now used by the sheet metal industry. To implement the above-described functions with the necessary precision would require substantial if not complete reworking or replacement of the existing machinery. It is therefore necessary to seek out an alternative approach which would allow for acceptable retrofitting of these machines to provide the necessary automatic machine control.

SUMMARY OF THE INVENTION

The present invention comprises a highly accurate, reliable and repeatable press brake control system to be used with existing press brakes. The press brake control system provides automatic and sequential stored control commands to determine a bend position and angle to be performed on the sheet metal workpiece. The location and angle control of each bend corresponds to a press brake controller having both a back gauge system and a ram control system together referred to as a two-axis back gauge controller. The term two-axis back gauge controller is descriptive of the present invention. The present invention further comprises a recording or storage element to receive either from a manual keyboard entry or a prerecorded tape information providing a sequence of bend parameters, which include bend angle value and location, material thickness and other information. The information thereby stored is interpreted by a calculator, controller or computer which produces control signals subsequently received by the press brake controls, allowing the metal to be formed in the desired manner. The calculator includes fixed or resettable reference values and devices to measure and compare the actual press brake position with the desired press brake position to create an error signal. The error signal is also stored and a correction signal is derived. The correction signal is weighted or averaged and subsequently added to the appropriate control signal to be received by the press brake actuator devices.

The positions of the press brake ram and the back gauge are determined according to position encoders which provide incremental actual position signals of a particular resolution. According to the present invention, the resolution of the position signals is enhanced by noise-insensitive position multipliers. The position multipliers each receive two quadrature position signals and produce a direction and position pulse output at up to four times the spatial resolution of the encoder signals. The multipliers include logic which filters random signals which occur at intervals less than a predetermined clock signal. In this manner, erratic multiplier signal output due to mechanical instability when the press brake is stopped, is suppressed. Furthermore, by inhibiting output signals until two identical successive direction signals occur, the multiplier output is more easily received by the main control unit.

The major elements of the press brake control system are located in two separated housings and communicate through serial data lines according to the RS 232 signal format. One housing includes the manual and data entry controls located in the proximity of the press brake operator position, the other contains the remainder of the system control apparatus, and is located in a convenient position. The physical and electrical environment wherein press brake systems are operated is typically hostile, producing temperature extremes, severe electrical noise, and mechanical vibration. To maintain the integrity of the information transferred between the two housings, a high-reliability communication system is included in the present invention. The press brake control system housings are described as a first and a second processor or terminal corresponding to a display unit and a main control unit, with a common communications channel interconnecting the two terminals. Each terminal is connected to the channel by a communication sequence or format. The priority is held by the terminal to be declared a "master," and is generally the display unit. Unless the main control unit needs to transmit data over the channel, the display unit will remain the master. When the display unit has data to send to the main control unit, the display unit simply commences the data transfer. The receiving terminal, generally the main control unit, is in turn declared as a "slave" terminal. If the main control unit requests the channel, the communications channel is established by preliminary channel requesting and subsequent acknowledgement before the desired message is then transmitted. Regardless of which becomes master, the transmitted message is echoed (retransmitted) from the slave to the master terminal which in turn verifies the echoed information by comparing it to the original information. If this does not agree completely, the information is retransmitted from the master to the slave. This retransmission is again echoed and the sequence is repeated until the desired message is transmitted and echoed without error. At that time, a verify signal is transmitted from the master device to the slave device which in turn echoes the verify signal. If the verify signal is improperly received from the slave by the master, the above described sequence is again repeated until the echoed verify signal is correctly received. In the event that both terminals simultaneously attempt to transmit signals to each other, or if both receive random data induced from noise signals when neither terminal occupies the channel, a special message sequence occurs wherein one of the two terminals is appointed the master and communication is initially established from that terminal. Having established a priority relationship, each terminal is checked for data to be transmitted to the other terminal. If there is data to be transmitted, the above-described master/slave sequence communication occurs until the message is received and verified. If messages cannot be verified after several attempts, an error message is generated and displayed to the operator. Otherwise, both terminals become quiet until the next transfer of data occurs.

BRIEF DESCRIPTION OF THE DRAWING

These and still further features of the present invention will be better understood according to the following detailed description and drawing taken together wherein:

FIG. 17 is the flow chart of the INTERRUPT 6.5 subroutine;

FIG. 18 is the flow chart of the CRETURN subroutine;

FIG. 21 is the flow chart of the SSTEP 0 subroutine;
FIG. 22 is the flow chart of the SSTEP 1 subroutine;
FIG. 23 is the flow chart of the SSTEP 2 subroutine;
FIG. 23A is the flow chart of the SLAVINC subroutine;

FIG. 26 is the flow chart of the MSTP 1 subroutine;
FIG. 27 is the flow chart of the MSTP 2 subroutine;
FIG. 28 is the flow chart of the MSTP 3 subroutine;
FIG. 33 is the flow chart of the TBR1A subroutine;
FIG. 34 is the flow chart of the the TBR 2 subroutine;
and FIG. 35 is the flow chart of the TBR subroutine.

DETAILED DESCRIPTION OF THE INVENTION

Figure 1:
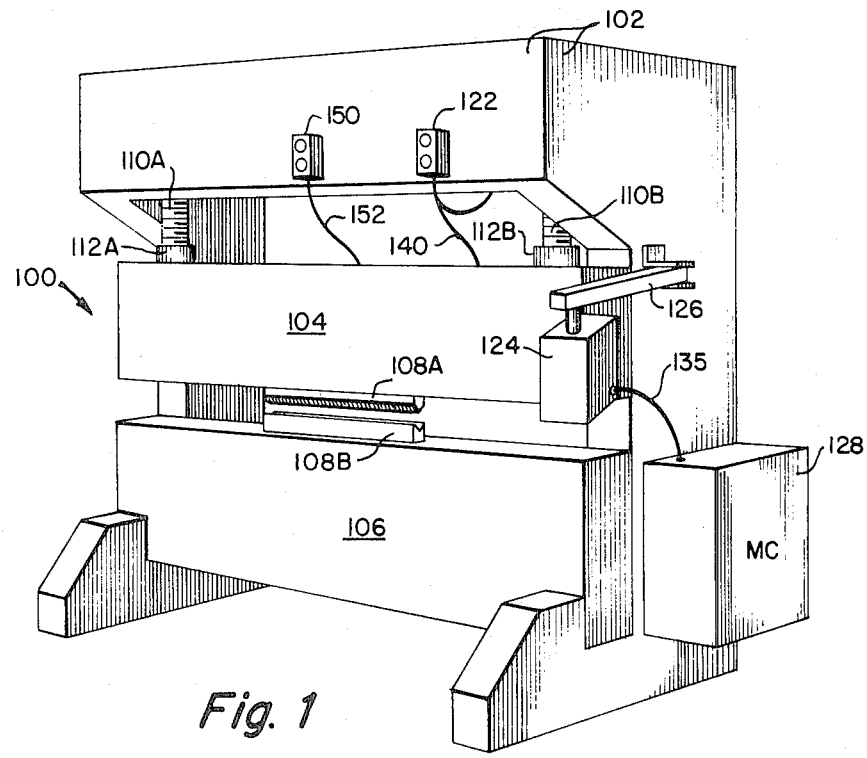
FIG. 1 is a front view of a press brake incorporating one embodiment of the present invention.
Figure 2:
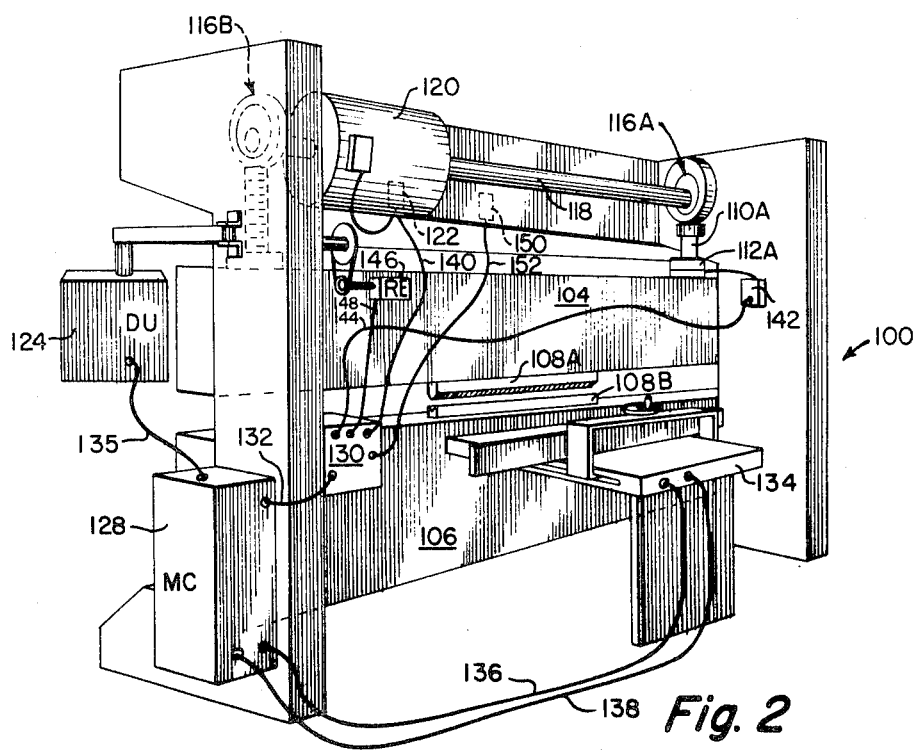
FIG. 2 is a rear view of a press brake incorporating one embodiment according to the present invention.

The press brake control system of the present invention is used with a mechanical press brake to form bends in sheet metal at predetermined angles. The present invention can either be connected to existing press brakes or installed within newly fabricated units. Front and rear isometric views of typical press brakes having the current system attached are shown in FIGS. 1 and 2, respectively. While the current preferred embodiment is discussed relative to retrofitting an existing press brake, other applications and embodiments of the present invention are anticipated. In particular, the invention is discussed in conjunction with a mechanical press brake, but may also be used with hydraulic or hybrid mechanical/hydraulic press brakes, wherein the control system is modified appropriately.

A mechanical press brake 100 comprises a heavy frame 102 supporting a ram 104 opposing a bed 106 having two metal forming dies 108A and 108B supported therebetween. The ram 104 is supported by ram extension arms 110A and 110B having screw adjustments thereon, mating with ram extension adjustments 112A and 112B. The ram extension adjustments 112A and 112B are coupled together and rotatably adjusted by connecting rod 114. The connecting rod 114 is typically driven by a rotationally directionally-controllable motor, not shown. The ram extension arms 110A and 110B are reciprocally displaced according to eccentrics 116A and 116B. The eccentrics (cams) 116A and 116B are simultaneously driven by axle 118 through a controlled revolution of 360°. The axle 118 is powered by a drive assembly 120 actuated according to jog switch control 122, which includes the required starting, stopping and braking system elements typically found in motor drive assemblies. The degree of bend performed by the bending brake as described is determined according to the maximum vertical excursion of ram 104 which in turn permits a controlled mating of dies 108A and 108B. The maximum excursion is primarily determined by the fixed operating range of the cams 116A and 116B. Also included in the movement of the die pulse are the random errors attributable to misadjustment and machine wear. An adjustable vertical distance is provided by the ram extension arms 110A and 110B which are adjusted by ram extension adjustments 112A AND 112B. The connecting rod 114 affixed to ram 104 is rotatable to travel up the extension arm 110A, providing a repeatable ram extension adjustment. The ram extension is adjusted so that the dies 108A and 108B come within the desired proximity distance at the maximum downward extension of the eccentric 116A and 116B. The results of ram travel to create a metal bend are described further in FIGS. 4, 5 and 6, discussed below.

The system is operated by commands received and stored by the display unit 124 mounted alongside the frame 102 of the press brake by a movable arm 126. The display unit communicates with a master control unit 128 located near the press brake, here shown alongside the frame. The display unit 124 and master control unit 128 are interconnected by communications link 135. The master control unit 128 connects to junction box 130 via lead 132 and controls the press brake as discussed below. In addition, a back gauge 134 limits the distance to which the sheet metal can be inserted into the press brake, and is also automatically controlled by the system according to the present invention. The master control unit 128 incorporates the controls necessary for back gauge operation and is connected to back gauge 134 by leads 136 and 138. Back gauge controller theory and operation are discussed in greater detail in U.S. Pat. No. 4,089,200 which is hereby incorporated by reference. The junction box 130 incorporates apparatus to condition and isolate the signals transmitted and received between the master control unit 128 and various position transducers and actuators of the press brake 102. The ram extensions are controlled through the existing jog switch 122 and leads therein. The control connections are made directly across the leads corresponding to up and down motions and brought to the junction box 130 by lead 140. The vertical position of the ram 104 is monitored by a linear position transducer 142 which is mechanically connected to the ram, and to the junction box 130 by lead 144. The transducer 142 provides an analog signal measuring the vertical displacement of the ram 104 relative to the frame 102. The extension adjustments 112A and 112B are monitored by rotary position encoder 146 and the signal produced is fed into junction box 130 via lead 148. A run light 150, indicating the status conditions of the press brake and operating systems described further hereunder, is connected to junction box 130 via lead 152. The commencement of operation or acutation of sequencing of the metal bending process is performed by the operator. The downward excursion of the ram is produced by a sequence of steps including the actuation of drive assembly 120.

Figure 3:
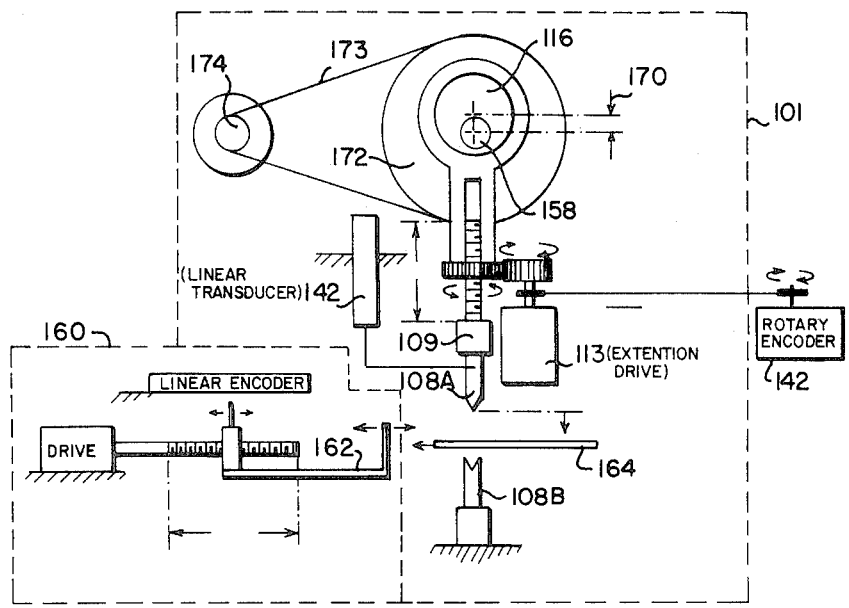
FIG. 3 is a mechanical function diagram showing ram and back gauge control systems.

The operation of the mechanical press brake and two dimension (axis) control system 100 can be understood in further detail by reference to FIG. 3. The existing mechanically-controlled press brake is shown within the boundary 101 and the associated back gauge system is indicated within the boundary 160. To the existing press brake 101, the linear position transducer 142 relating the exact position of the ram 104 to the frame 102 of the press brake 100 is added. Also added is the rotary position encoder 146 which is connected to an extension drive 113 and which measures the adjustment which drive 113 makes to the extension or distance bias provided to the ram as described earlier. A back gauge bar 162 limits the rearward movement of sheet metal 164 as it is moved into the press brake between the die 108A and 108B. The back gauge bar 162 is controlled by the back gauge system 160 and is in turn controlled by the master control 128 of the press brake system. The operation of the back gauge system is described in greater detail in the incorporated U.S. Pat. No. 4,089,200, mentioned earlier. The back gauge limitation on the position of the sheet metal 164 within the press brake defines the position at which the punch 108A and die 108B will bend the sheet metal 164. The degree of bend of the sheet metal is determined primarily by the downward excursion of ram 104. If the space between the die and ram leaves a gap when in contact with the sheet metal 164, an "air" bend is accomplished that is slightly less than the angle of the apex of the dies 108A and 108B. A deeper excursion of the ram 104 will cause a more acute bend (up to the maximum angle defined by the apex of the die). Still further excursion beyond the distance available between the dies and the metal can cause fracture of the die or other serious damage to the machinery. The ram eccentric 116 is rotated about an axis 158 providing a fixed excursion 170, twice the dimension of the mechanical configuration of the ram eccentric 116. The eccentric 116 is driven about the axis 158 by a rotational pulley drive including a pulley 172, a ram drive 174 which also includes a pulley, and suitable belt means 173 connecting therebetween. The ram drive 174 is controllable so as to actuate the ram extension elements and the ram 104 throughout a fixed predetermined vertical distance, according to control signals from the above-mentioned master control unit.

A typical hydraulic press brake (not shown) incorporates the ram extension and the eccentric as single displacement operation of one or more hydraulic rams. The hydraulic ram is extended until a mechanical limit switch is actuated, which then causes the ram to retract. The control system of the present invention is adapted to automatically adjust the mechanical limit switch in the same manner that extension drive 113 and the position encoder 146 control the mechanical ram of FIG. 3.

Figure 4:
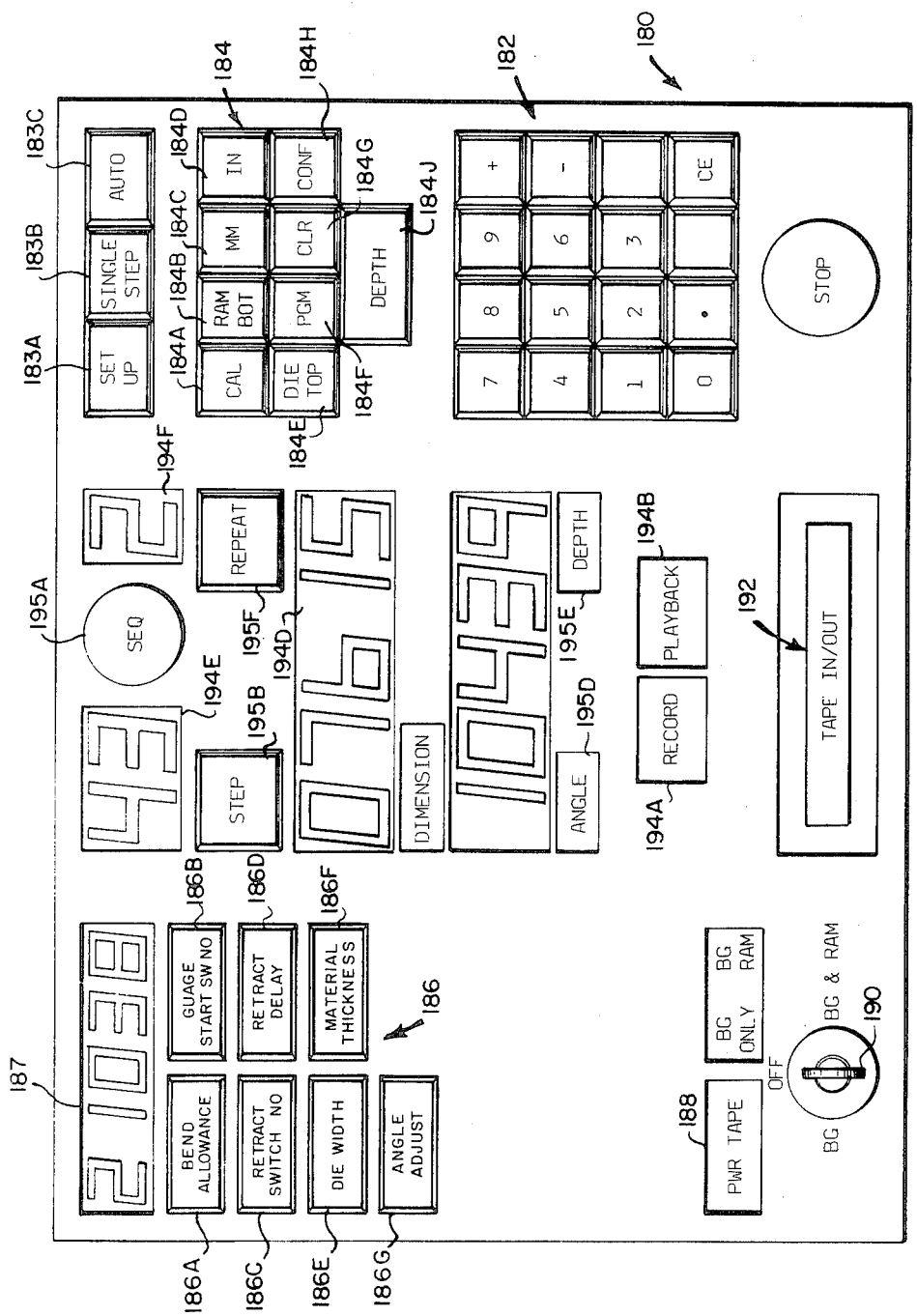
FIG. 4 shows the operator view of the display unit front or operator control panel.

The front of the display unit 180, shown in FIG. 4, contains substantially all operator function control devices for programming and controlling the back gauge and ram control through their respective control systems (not shown). The functional aspects of the various control devices contained within the display unit visible from the front are here briefly mentioned and described in greater detail below. Numerical data is received through a keypad 182 containing the numerical sequence 0-9, plus (+) and minus (−), a clear key and other keys. The operator control of the storage of entered data, various constants and machine calibration instructions is provided by control group 184 which includes calibrate, ram bottom limit, millimeter or inch selection. Also included are a die top 180° position indicator, a program and clear position and a confirm switch including a record depth device. Additional control functions are provided by the switches within group 186 which allow the operator to specify a bend allowance, gauge start switch or retract switch, and a retract delay time. The die width, material thickness, or angle adjustment may be specified within the group 186, which also includes a five digit numerical display to indicate the numbers entered. The power, tape recorder and mode of operations are monitored by indicators of group 188. These indicators are typically light emitting diodes (LED). The entire system is enabled by a front panel key switch 190 which allows the operator to select operation of the back gauge controller alone or the back gauge and ram controller together. A facility to receive pre-recorded instructions via magnetic tape cartridge is provided at 192 with control switches 194A and 194B, which specify a record sequence or playback sequence, discussed below. The overall operations of the system are monitored by group numerical readouts which include a step indicator, a repeat indicator, a dimension readout and an angle and depth indicator.

Figure 5:
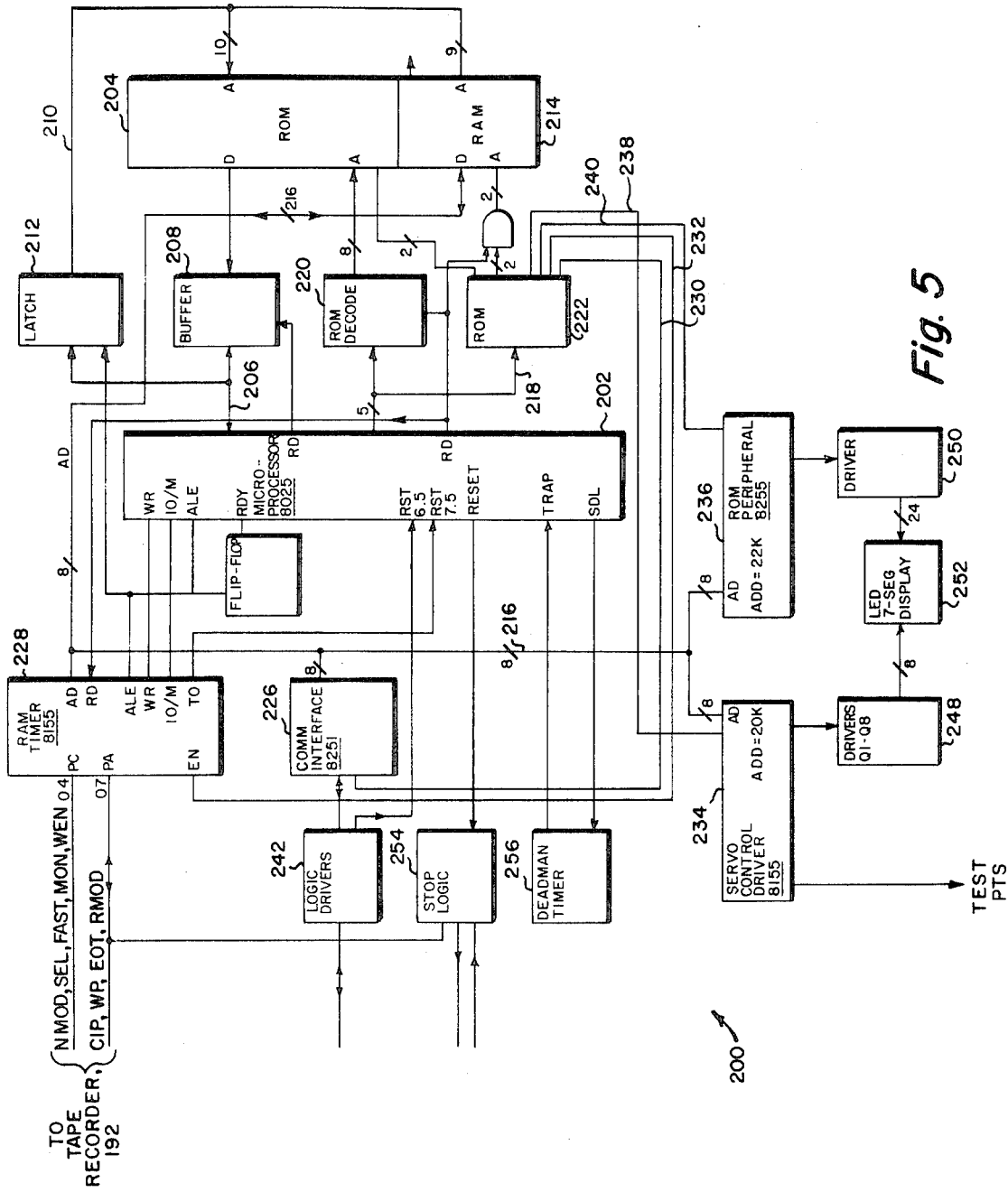
FIG. 5 is a block diagram of the display unit processor system.

The back gauge and ram controller of the present invention includes two processing systems, one of which is a display unit procesor system shown in the block diagram of FIG. 5. The principal function of the processor system 200 shown in FIG. 5 is to control the information displays and to provide ram and back gauge dimensions together with the display elements, and is called the display unit. The processor system of FIG. 5 also controls a tape cassette player/recorder 192, discussed above. Specifically, the display unit includes a microprocessor device, part number 8085, made by Intel Corp. of California (and by several second sources), and used in combination with a variety of other integrated circuits wired in a specific manner to form the processor shown in FIG. 5. The interconnections of these devices shown in FIG. 5 are made according to standard digital techniques which are known to the art and are not be described in detail except where they differ from the art. The interconnections shown in the drawings are indicated by a single line between the blocks. When a plurality of leads is used for each signal path, the line has a diagonal slash with an adjacent number indicating the number of leads in that interconnection. The microprocessor 8085 labeled 202 operates in conjunction with read-only memory 204 having the operating program stored therein. The processor 202 communicates to the memory via address and data bus 206. The information on the data and address bus 206 is multiplexed and of a nature which requires a minimal lead length of that data bus. The data bus 206 is buffered by device 208 which includes storage and gate elements generally available in the art, specifically a part number 8216 manufactured by Intel Corp. of California. The read-only memory (ROM) 204 and other devices described below are connected to the address and data bus 206 through buffer 208. Additionally, the memory address on leads 210 is separated by an address latch 212, typically implemented by a part number 8212 by Intel. The signals enabling the latch 212 and the buffer 208 to operate in their respective modes are provided by the processor 202 by the address latch enable (ALE) and the read (RD) signals, respectively, according to techniques described in the Intel component data catalog, published by Intel Corp. of California, 1980 incorporated by reference. As will be described hereunder, the processing system includes memory means which temporarily store information which is then modified during the system operation. This alterable memory storage is a random access memory (RAM) marked 214, which receives the address signal along leads 210; the data is transferred to the processor along leads 216 as is the data from the read only memory 204. However, the RAM also receives information along lead 216 from the processor 202 (through the buffers 208). The processor 202 also sends address signals along leads 218 to be received by ROMs 204 and address decoders 220 and 222, which in turn provide selection of devices capable of being addressed according to their respective decoded interal code. The address decoder 222 controls a serial communication interface 226 and a tape cassette interface 228 by respective enable signals on leads marked 230 and 232. Additionally, servo control driver 234 and display driver interface 236 are controlled by enable signals by leads 238 and 240, respectively, from the address decoder 222.

The individual external devices are connected to the data bus 216 and to the other processor peripheral functions to accomplish their individual functions, discussed below. For instance, the tape cassette interface 228 controls the specific tape cassette functions under microprocessor 202 control. The tape cassette interface 228 comprises two ports including a plurality of digital signal wires which receive and transmit data to and from the cassette transport mechanism.

The back gauge may be independently operated according to the following instruction sequence. Turn the front panel key switch 190 to the full counter clockwise, or back gauge position. The system will come on in a set-up mode. Next, enter the program by first entering the step number and the depth through the keypad 182 in sequence until all program steps are entered. Place the program in the first step and depress the single-step key 183B. Press the calibrate key 184A and set the back gauge to a predetermined position. Next, press the sequence key 195A to move the back gauge to the first step of the program. Make a trial bend and measure the workpiece. Enter any required corrections through the keypad 182. Depress the sequence key 195A to execute the program again with the corrections. Next, make another trial bend. If no corrections are needed, depressing the sequence key will move the program to the next step to be executed. Repeat each step of the back gauge program until the entire program has been verified. Return the system to the first step by depressing the program key 184F. If a delay is desired after any step within the back gauge operation, depress the retract delay key 186D, then key in the desired delay time in seconds (0-99) and verify the delay time as it appears in the numerical display 187. Depressing the retract delay key 186D a second time enters the delay into the memory. Depress the auto key 183C, followed by the sequence key 195. If the back gauge is not already in position for step 1, it will move to that position when the sequencing key is operated. Next, set the ram near the top of its stroke by operation of the ram switch (FIG. 1, 154). This sets the ram switch circuitry, which is activitated only when entering the automatic sequence (AUTO) mode for the first time, or after a power shutdown. Thereafter, make the first bend. After completing the bend with the ram near the top of the stroke, the back gauge will then move to the proper position for step 2 of the program. Continue the program sequence until all bends have been made. Upon completion of the last bend of the program, the back gauge will move to the proper position for step 1 of the program and the system will be ready for the next workpiece.

The servo control system is operable in a two axis mode by rotating the front panel key switch 190 to the fully clockwise position to engage the system control of the ram as well as the back gauge. The system will come on in the set-up mode. Next enter the program as described above. Place the program in step 1. Depress the single step key 183B. Raise the ram to the top of the stroke and press the calibrate key 184A. Mechanically calibrate the back gauge by setting the gauge bar surface precisely to 4.000 inches behind the center of the die; the ram bottom light 184B should then be flashing. Set the ram to the true bottom of the stroke by manually positioning the ram so that the die and the punch (FIG. 1, 108A and 108B, respectively) are in contact but not under pressure. With the ram bottom established in this manner, an absolute safety limit is established for proper operation of the safety equipment. Next, a program ram bottom is determined by inserting a piece of stock material between the punch and the die and manually moving the ram to the position where the die and the punch are separated only by the thickness of the stock material. The stock should be just barely held therebetween. Alternately, make a trial bend to provide a bend angle (FIG. 6, A) just slightly steeper than the steepest angle within the program and repeat the step which sets the bottom for safety limits. Next, depress the ram bottom key 184B to enter the ram extension value. The die top key 184E will now flash. Use only the jog (mechanical override of the ram motion) switch control 122 to raise the ram above the top of the die. Insert a piece of stock across the die and lower the ram with the jog buttons until the stock is just held snugly. Next, press the die top key 184E to enter the ram extension value. The die width key 186E will now flash. Press the die width key 186E (flashing will stop) and check the value display in the numerical display 187. If it is the correct value, press the die width key 186E again, or alternately enter the correct value for the width of the die and depress the die width key again. The material thickness key 186F will begin to flash. Press the material thickness key 186F to verify that the displayed material thickness value is appropriate. Press the material thickness key 186F and the angle prompting sequence is complete. The system will now make trial bends. Press the sequence key 195A to move the back gauge and ram to the proper positions for the first step. A trial bend may now be made. For instance, if the measured angle is 3 degrees too large, press the angle adjust key 186G, the minus key, the 3 key and the angle adjust key in sequence. Press again the sequence key 195A to set the ram to the recalculated value, and remake a trial bend. Repeat the sequence if necessary until the bend is within the desired value. The first correction will usually bring the bend within 1° of the proper value. Also measure the workpiece and make any required corrections to the back gauge dimension (described earlier). If all corrections are complete for the first step, press the sequence key 195A again to move the program to step 2 and readjust the back gauge and ram positions for the second step. Repeat the adjustments of each particular step of the program until the entire program has been verified and/or corrected. Place the system again in step 1 by depressing the step key 195B, the 1 key, or the sequence key 195 in that order. If a delay is desired after any step, depress the retract delay key 186D, then enter the desired delay time in seconds (0–99) and verify the delay time as it apprars in the numerical display 187. Then depress the retract delay key 186D or the sequence key 195A in that order. If a delay is desired after any step, depress the retract delay key 186D, then enter the desired delay time in seconds (0–99) and verify the delay time as it appears in the auxiliary display. Then depress the retract delay key 186D a second time to enter the delay value into the control unit memory. Next depress the auto key 183C and the sequence key 195A. If the back gauge and ram are not in the position for the first step, they will move into that position when the sequence key is depressed. Cycle the ram through one complete stroke stopping near the top of the stroke. This sets or cocks the ram switch circuitry, and is only required when entering the auto mode for the first time, or after a power shutdown. The first bend may now be made. The bend is made by depressing the ram switch. Upon completion of any bend step (with the ram near the top of the stroke) the back gauge and ram will then move to the proper position for the subsequent step of the program. The sequence continues until all bends have been made. Upon completion of the last bend of the program, the back gauge and ram will move to the proper position for the first step of the program; the system is now ready for repeating the bend sequence with the next workpiece.

The desired bend angles may be determined empirically through a sequence of trial bends. After the desired bend has been obtained, the recorded depth key 195E is depressed to transfer the parameters of the ram extension into the controller memory. The ram depth value is displayed in depth display 194C and will be the ram extension required (relative to the ram bottom position) to repeat the bend angle obtained with the trail bend. More specifically, the empirical set-up method includes the following steps. Turn on the front panel key switch 190 to the fully clockwise position. The system will then come on in the set-up mode. Enter the back gauge program and operate the depth key 195E to place the system in the depth mode. Then place the program in the first step, followed by depressing the single step key 183B. Next raise the ram to the top of the stroke and press the calibrate key 184A. The ram bottom light 184B will begin flashing. Manually set the ram to the true bottom and set the ram stroke as accurately as possible, to establish the absolute ram bottom safety location. Thereafter, establish the ram bottom reference by inserting a piece of stock on the thickness to be used between the die pieces 108A and 108B (of FIG. 1) parallel to the slanted sides of the die and lowering the ram using the jog switch control 122 until the stock material is just barely held therebetween. Then depress the ram bottom key 184B to enter the ram extension value. The system is now ready to make trial bends. Press the sequence key 195A; the back gauge will then move to the first sequence position for the first step. The ram will remain at the ram bottom position since the depth register at this time has a zero dimension stored therein. Adjust the ram extension with jog switches to make the trial bend. Repeat until the desired bend angle has been obtained. Press the record depth key 195E to store the final ram extension dimension in the depth display and control memory. Move the program to step 2 using the sequence key 195A and repeat the trial end procedure. Again, press the record depth key 195E to store the final ram extension dimension. Repeat the sequence until all bends have been made. Place the system in step 1 by pressing the step key 195B and the 1 key (in keypad 182) in sequence. Next press the auto key 183C followed by the sequence key. If the back gauge and the ram are not in the position appropriate for step 1, they will move to that position when the sequence key is operated. Cycle the ram around one complete stroke, stopping near the top of that stroke. This sets or cocks the ram switch circuitry and is only required when first entering the auto mode. Make the first bend. Upon completion of the bend (with the ram near the top of the stroke) the back gauge and the ram will move to the proper position for the step 2 of the program. Continue until all bends have been made. Upon completion of the last bend of the program the back gauge and ram will move to the proper position for the first step of the program for subsequent sequence operation with the next work piece.

The control system according to the present invention is also operable wherein a tape recorder can record the current back gauge and ram sequence, or playback an existing sequence into the ram and back gauge control unit. The particular tape storage unit is a cassette tape recorder Model No. 25-300 manufactured by Microcommunications Corporation of Waltham, Mass. The operation requirements and system interface details are described in the Installation and Planning manual for the Electronic R/W System, published by Microcommunications Corporation and is hereby incorporated by reference. To record the existing controller sequence insert the tape into the opening provided on the front panel and press the record key. The tape light will light and remain lit for 8–15 seconds. If nothing happens when the record key 194A is depressed, verify that the cassette is not record-protected (inhibited removal of the appropriate material on the body of the cassette itself). Next the displays will blank during the recording. When the displays come back on, recording is complete. The program will be in the first step regardless of which step sequence the control system was in when the recording began. To set up the control unit by playback of a prerecorded program, press the program key 184F and then the key corresponding to the number program wherein the prerecorded program is to reside such as number 3. Next, press the clear key 184G followed by the program key 184F to clear and load the program. If the program is not cleared, activating the playback key 194B will be ignored. Next insert the cassette. Select the program in which you want to store the cassette program. Press the playback key 194B whereupon the tape light should light and remain lit for 8–15 seconds. The display should blank during the playback period. If nothing happens, clear the program by depressing the clear key 184G. When the display returns, the playback is complete and the program data will appear on the appropriate displays. The angle will come on in the inch/M mode and the angle/depth mode in which the recording was made. If the data as read from the tape and stored in the control unit does not agree with the data on the tape, the tape will continue to run. The display unit will make three attempts to load the program from the tape before aborting further attempts. If the program is not accepted, remove and reinsert the cassette and try the above sequence again. If rejection of the program continues, the tape is defective and the program must then be entered again manually.

The control unit also functions to prompt the user by sequentially flashing lights for indicators as the appropriate information is necessary. Until the information has been received and the prompting satisfied, all other keys and functions are disabled. The system cannot be placed in the auto mode when a key light is flashing. However, the system can be returned to the set-up mode if desired. The auto key 183C will flash when the auto key 183C is pressed to indicate that the sequence key 195A must be pressed to bring the back gauge and the ram (if in dual-axis mode) to the proper position for the displayed step. If the controller is in the back gauge only mode, the prompting must be satisfied by the appropriate data entry before the single step operation can occur. If the controller is in the two axis depth mode, calibration prompting will occur first. When the system is calibrated and the appropriate information is stored, the ram bottom key light will flash. Setting of the proper ram extension in the operation of the ram bottom key 184B (as discussed above) will complete the prompting sequence. If desired, a new ram bottom value can be entered by operating the system in the single step mode. First depress the ram bottom key 184B to restart the ram bottom prompting which will be indicated by the flashing ram bottom key. Readjust the ram extension and depress the ram bottom key to complete the prompting cycle. If the controller is in the two angle mode, calibration and ram bottom prompting will occur identically to that discussed for the depth mode above. When the ram bottom key is operated, the die-top 180° key 184E will flash. The ram extension must be set and the die top 180° key depressed. The die width key 186E will then flash. The die width key must now be pressed to read the value of the die width in the numerical display 187 and the flashing will cease. The value of the die width should be verified and corrected if necessary. The prompting sequence cannot continue without a die width entered (preset at 0) so a die width value must be entered. After the value is entered, the die width key 186E is depressed and the value stored. The material thickness key 186F light will now flash. Entering the material thickness and pressing the key 186F will stop the flashing display and enter the value of the material thickness. The value will be displayed on the numerical display. As with the die width, the displayed value should be verified by the operator and corrected if appropriate. The material thickness key 186F should now be depressed for a second time and the prompting sequence is now complete. If desired, a new ram bottom value can be entered as described for the depth mode. The prompting will continue from that point and it will be necessary to enter a new value using the die top 180° key 184E, followed by verification and key operations of the die width material thickness keys. If desired, a new die top 180° value can be entered (in the single step mode) by pressing the die top 180° key 184E which will start the prompting sequence at that point by flashing of the die top 180° key 184E. After a new die top position has been entered by pressing the key, the prompting sequence will continue from that point through the verification of the die width and the material thickness values.

Figure 6:
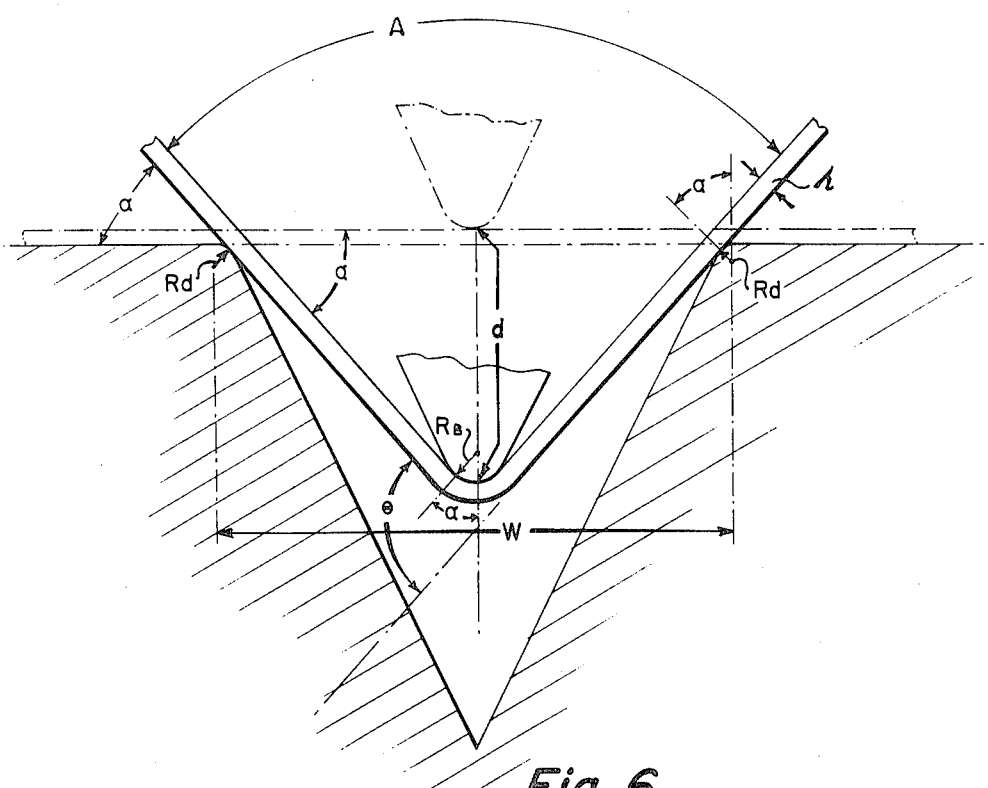
FIG. 6 is a cross-section of the die and punch showing geometric relation of bend parameters.

In addition to the display, control, and information storage function, the display unit calculates the distance through which the punch 108A (FIG. 1) moves into the die 108B opening to cause a metal bend of a pedetermined angle. FIG. 6 shows the geometric and trigonometric relationships of the various angles used in the determination of the metal bend angle. The parameters labelled in FIG. 6 are defined in Table I below:

TABLE I

A = 180° − 2α = inside bend angle
α = 90° − A/2 = tilt angle
Rd = die corner radius
Rb = inside bend radius
Rp = punch nose radius
t = material thickness
w = die width (between Rd)

The trigonometric relationship of the defined parameters of Table I are related by Equation 1:

$$\tan \alpha = \frac{d - (Rd + Rp + t)(1 - \cos\alpha)}{w/2 - (Rd + Rp + t)\sin \alpha} \quad (1)$$

from which the punch excursion distance d is derived and shown in Equation 2:

$$d = (Rd + Rp + t)(1 - \cos \alpha) + [w/2 - (Rd + Rp + t) \sin \alpha] \tan \alpha \quad (2)$$

For certain materials, the bend will not remain at the maximum angle formed during the bending process. The resulting "springback" of the material may comprise a significant bend angle error. The control unit optionally calculates and includes a springback correction factor, whose parameters are defined by Table II:

TABLE II

R' = inside radius after springback
α' = tilt angle after springback
Δα = springback correction
σ = yield strength
γ = Poisson's ratio (steel = 0.3; aluminum = 0.33)
E = elastic modulus
M = bending moment per unit length The uncorrected tilt angle is defined by Equation 3:

$$\alpha' = \alpha Rp/R' \quad (3)$$

The inside radius after springback is calculated by first calculating the bending moment with Equation 4:

$$M = \sigma t^2 / 4 \quad (4)$$

and then substituting the result in Equation 5:

$$\frac{1}{R'} = \frac{1}{Rp} - \frac{12M}{Et^2}(1 - \gamma^2) \quad (5)$$

The springback correction angle is provided by first calculating the variable k of Equation 6:

$$K = \frac{3\sigma}{E}(1 - \gamma^2)\frac{Rp}{t} \quad (6)$$

and substituting in Equation 7:

$$\Delta\alpha = \alpha' K/(1-K) \quad (7)$$

to produce a corrected computed tilt angle:

$$\alpha = \alpha' + \Delta\alpha \quad (8)$$

The following empirical determination has been made as part of the present invention. If the variable Rp is greater than 0.156W, then Rb is set equal to Rp. However, if Rp is less than 0.156W, then Rb is set equal to 1.56 W − 2Rd sin α. More precisely, if Rp is less than 0.156W, Rb = 0.156 (W − (2Rd + 2Rp + 2T) sin α). In the alternative, it has been found that if the width of the die is greater than or equal to eight times the workpiece thickness, and the radius of the punch is greater than 0.156 of the width of the dye then the radius of the punch should be greater than one and a quarter times (1.25) the thickness of the material and the inside bend radius Rb will equal the punch radius Rp.

In FIG. 5, the communications interface device 226 is connected to line drivers 242 which provide RS-232 format EIA level signals to be received by a second processor unit, master control unit processor system 400, discussed below and shown in FIG. 7, as well as interrupt signals RST 6.5 received by processor 202 on lead 229. The servo control driver 234 connects to display drivers 248 which provide the necessary voltage and current to control the visual displays. The display driver interface 236 connects to a display driver 250 which provides a plurality of display driver signals to a seven segment LED display unit 252 which receives some display signals from display driver 248, mentioned above. The display 252 generally includes a plurality of display elements each comprising at least one light emitting diode (LED) to form a singular indicator or a multiple section partial alpha-numeric indicator. The LED devices are connected in a matrix array form having two conductor groups, one of which comes from the drivers 248 and the other from the driver 250. One or more of the display elements is actuated by addressing a location by providing a signal on each of the two corresponding conductors associated with the desired LED.

In addition to the above-mentioned interface devices controlled by the processor 202 through the data bus 206 and leads 216, there are additional specific control logic groups having other functions. One such logic group is a stop logic group 254 which receives commands external from the processor diagram of FIG. 7 to cause the processor to be stopped or reset in an orderly fashion. In addition, logic group 256 monitors the continued operation of the processor 202. If the processor 202 should come to a stop or inoperative position due to hardware or software problems arising with the system, which may be caused by failures of other associated components, the logic group 256 will disable the processor 202 according to a predetermined sequence. This operation is typically called a deadman timer, and also appears in the master control unit discussed later.

The display unit processor system 200 shown in FIG. 5 and housed in display unit 124 shown in FIG. 1 and FIG. 2, communicates with the master control unit processor system 400 housed in master control unit 128 via communications link 135. Each processor system 200 and 400 includes a serial interface. The block diagram of the main control unit processor system 400 is shown in FIG. 7. The serial communications are received by driver and receiver logic circuits 408 in control unit 400 which convert the EIA RS-232 signal levels present sent from lead 244 to a serial TTL signal on leads 410 and 412, received first by serial interface 406 and in turn by microprocessor 402.

Figure 12:
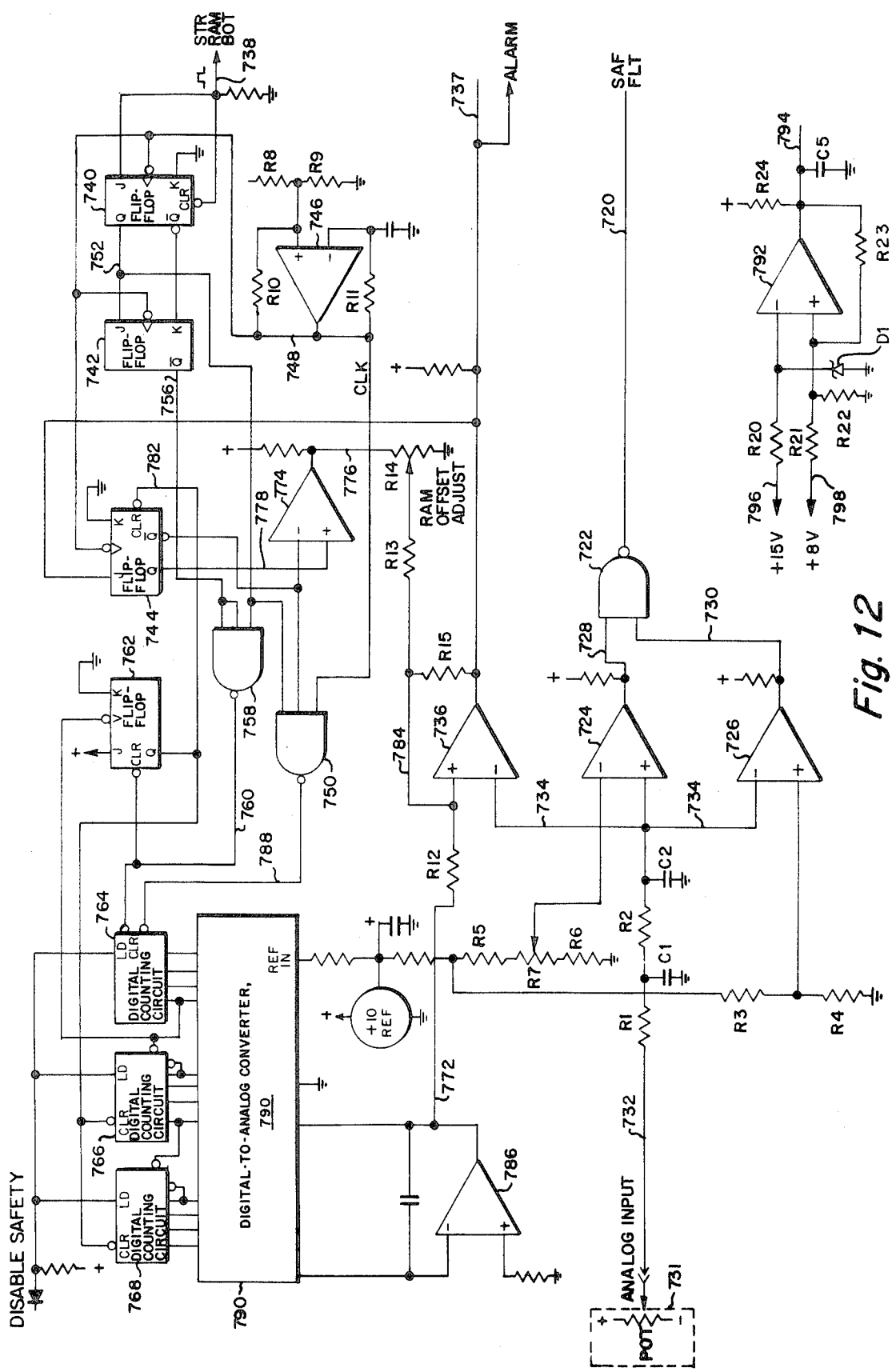
FIG. 12 is a schematic of the safety alarms circuit.

The master control unit processor system 400 of FIG. 12 is similar to the control system 200 shown in FIG. 5. The microprocessor 402 responds to a program stored in read only memory (ROM) 404 by signals conveyed over a data bus 414. The bus 414 also supplies address signals, stored by address latch 416 which are in turn received by ROM 404 and binary 1-of-8 selectors 418 and 420 which provide enable signals to the read only memory 404, the serial interface 406, and other interface and input/output devices described below. The main controller of FIG. 7 controls the back gauge servo as well as the ram position. Accordingly, the plurality of signals required by the back gauge servo and the ram position controls are provided by an interface device 422 connected to the processor 402 through the bus 414 and enable control leads 424 from selector 420 according to the address received through the address latch 416 from the bus 414. The interface device 422 is typically part number 8155 made by Intel Corp. of California, and includes three parallel binary I/O ports. The first port communicates with the back gauge servo on leads 423 providing the direction and speed signals as necessary in the present embodiment. Specifically, these signals include the sign (±), slow, fast, E0-E3 signals and the stop back gauge servo signals. The second port controls the ram and provides the necessary signals on leads 421. These signals include the ready signal, the ram (104, FIG. 1) up signal, the ram down signal and the ram enable signal. The second port also communicates with a safety circuit 700, described later. The third port of interface device 422 is connected to enable bus driver gates 428 which allow external ram and back gauge signals to communicate directly to the processor bus 414.

The signals received by the processor through the bus gates 428 include the ram and back gauge signals from the respective multiplier circuits discussed in greater detail below. These signals are received on leads 442. Additionally, safety monitoring circuits, also discussed below, are received along leads 444, ram switch signals are received on leads 446 as well as system selection line from front panel key switch being received on leads 448. Except for encoder multipliers 451, 453 and the safety circuit 700, the details of the connections between the above-described elements of the elements of the main processor system 400 are provided by techniques and systems generally known.

The ram position is monitored by encoder 146 shown in FIG. 1 and the back gauge is monitored by an encoder within the back gauge 134 also seen in FIG. 1. Signals derived therefrom are received by back gauge encoders enclosed in master control unit 128. These signals are shown in FIG. 7 as appearing on leads 450 and 452 corresponding to back gauge position and ram position, respectively. These signals are subsequently processed by position multipliers 451 and 453 respectively, which increase the position resolution by a factor of four by processing the received signals in a manner now described.

The ram and the back gauge positions are determined through the use of position encoders which incorporate a piece of optically readable information affixed to one portion of the machinery, to be read by optical sensors mounted to the other part of the machinery, the two being movable relative to each other. For encoders known in the art as incremental encoders, the optically readable information includes light and dark bands which alternate according to a fixed linear interval for linear displacement, or for fixed angular displacement when used in an angular incremental encoder. An example of an encoder of this type is shown in U.S. Pat. No. 4,039,826, assigned to Dynamics Research Corporation, herein incorporated by reference. As part of these transducers, it is desired to provide two signals in quadrature, that is, at 90° to each other relative to the angular or linear displacement typically called sine and cosine singals. To accomplish this, there are typically two separate optically readable strips displaced relative to each other at one-half the repetition interval to be read by two separate optical sensors which are in line. An alternate manner incorporates a single optical strip read by two sensors, the second of which being relatively displaced at one-half of the interval distance. The resulting signals from the optical sensors correspond to the light and dark markings of the encoder strip, but at a 90° offset relative to each other. This offset results in a transition of a low signal to a high signal from one transducer at the approximate mid-point of a constant signal from the other transducer, as the encoder strip and the sensors are moved through a constant movement. These two signals are hereinafter referred to as sine and cosine signals, generally known as such in the art.

Occasionally the encoder, as attached to the ram or back gauge apparatus, will come to rest at a position where one of the sensors is reading the encoder strip at the exact transition point from light to dark. In this position, the logic circuits providing a position signal are highly sensitive to mechanical noise vibration which causes the resulting sensor signal to frequently alternate between high and low logic levels. This uncertain response is further complicated by the use of digital multipliers which use the signal transitions of the sine and cosine signals to increase the displacement resolution of the encoders. The present invention overcomes a substantial problem of noise sensitivity as follows. The high frequency rejection requires that the input pulse must be at least as wide as the one clock period. If there are any transitions during the interval of one clock period, signals are rejected in hat period, a first transition during interclock intervals is not seen until the next clock pulse and the input must not change between the first and second clock pulse.

The position multiplier according to the present invention employs both sine and cosine sensor signals, hereinafter designated A and B, as well as two internally produced derivatives of each, corresponding to the positive edge and the negative edge indication of the sensor signal square wave. To detect both derivatives of each A and B signal, two pairs of derivative detectors are required. Within each pair, the first of two derivative detectors operates on the A signal and the second operates on the inverted A or the $\overline{A}$ derived directly from the encoder. Similarly, within the second pair of derivative detectors, a first derivative detector operates on the B and the inverted B or $\overline{B}$ derived signal.

Figure 8:
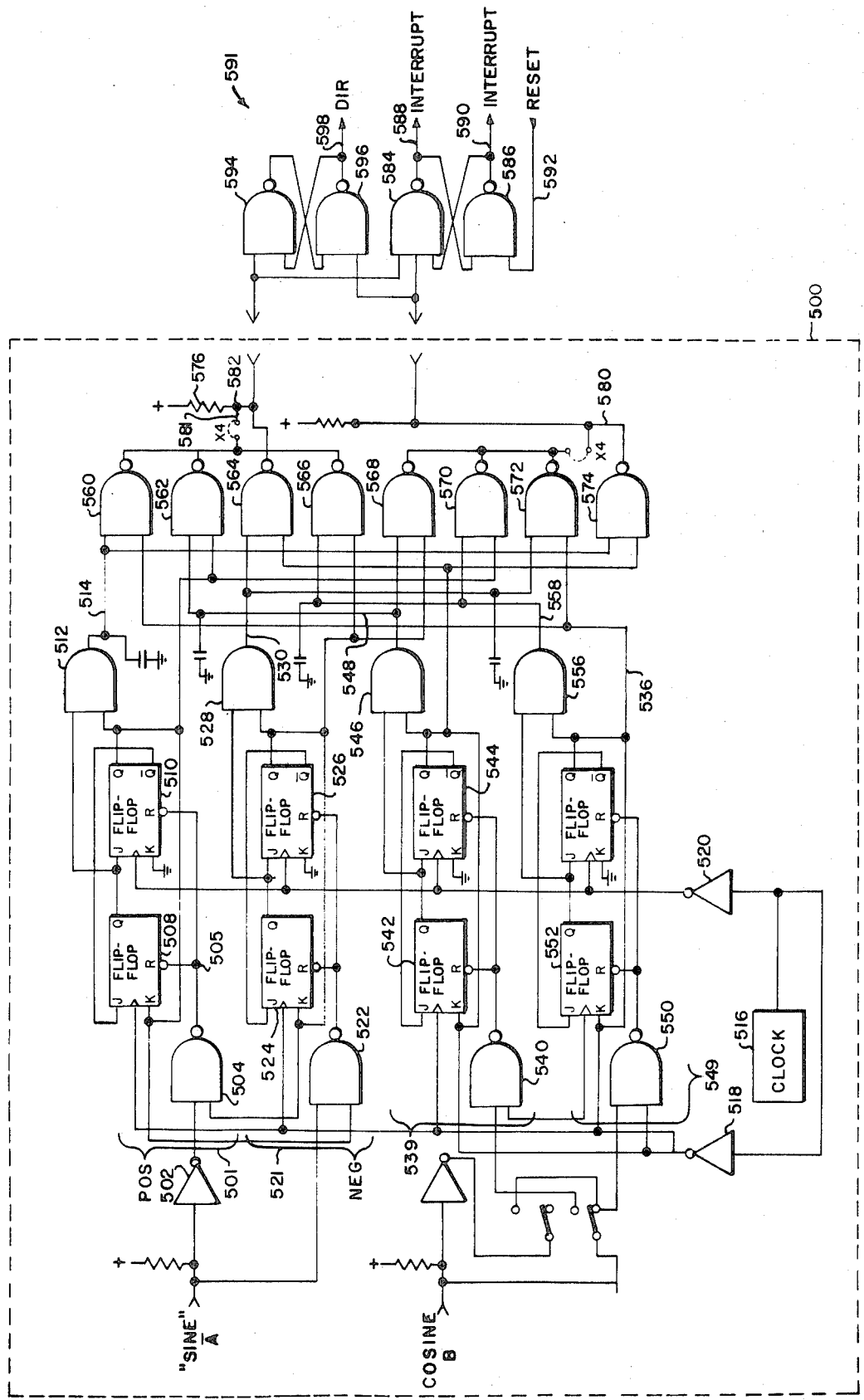
FIG. 8 is a schematic of the position encoder-multiplier and processor system interrupt circuit.
Figure 9:
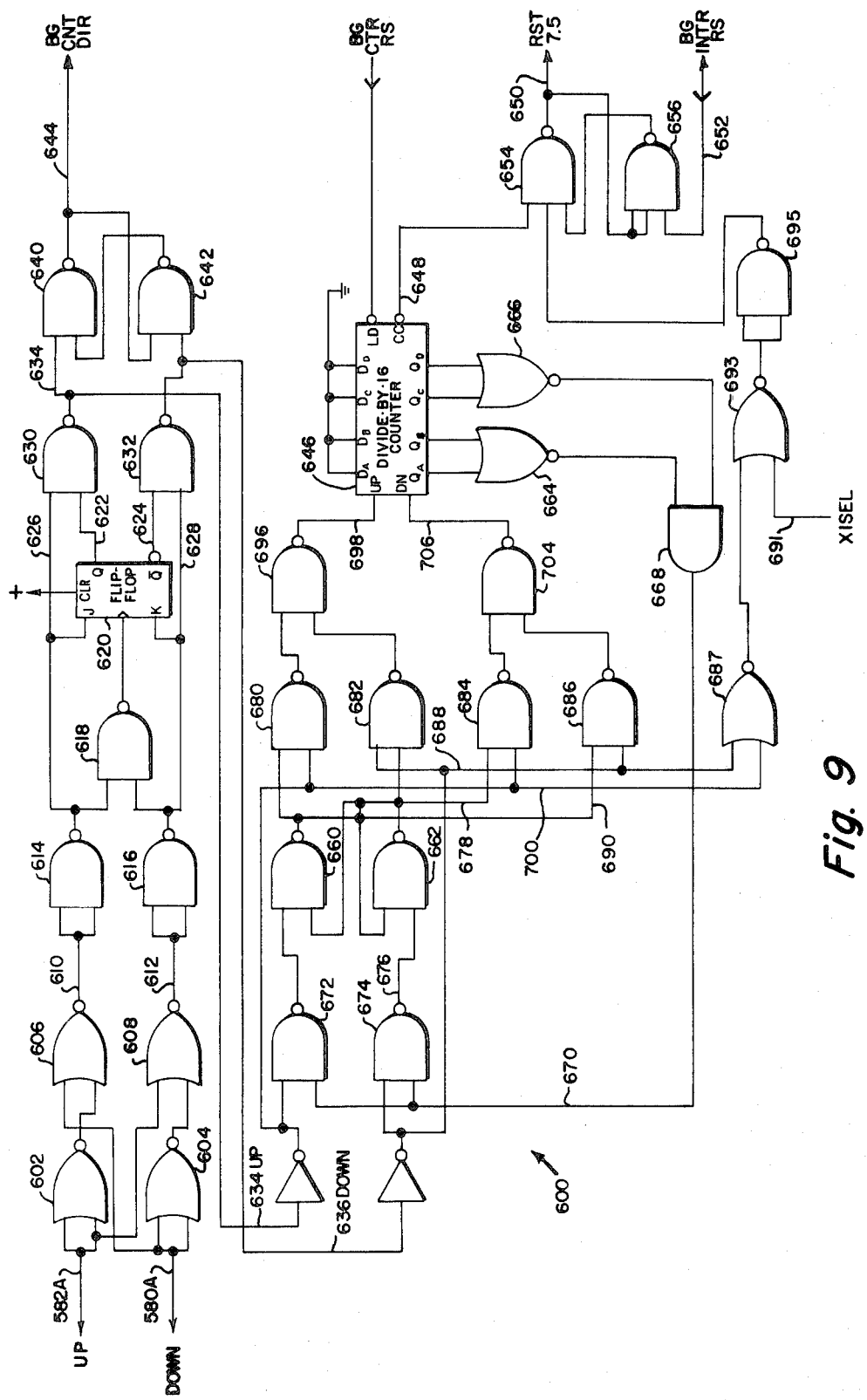
FIG. 9 is a schematic of a processor system interface circuit for the multiplier of FIG. 8.

Except for connection to the interrupt 591 and interface 600 circuitry, the multiplier circuit 500 is the same for both the ram and the back gauge, and is represented by a single circuit 500 shown in FIG. 8. The logic for the derivative detectors is shown as part of the position multiplier circuit 500 in FIG. 8. The associate wave forms are shown below in FIGS. 10 and 11. The microprocessor interrupt 591 and interface 600 circuitry is shown in FIG. 9, and in part of FIG. 8.

A ram position multiplier is shown in FIG. 8 wherein the sine input is represented by $\overline{A}$, that being the inverted logic of the A square wave input from the encoder disc, not shown, and the cosine, or B input provided by the second decoder signal. Each of the $\overline{A}$ and B signals have their own section of logic to detect the relative rising and falling edges thereof. The R input to the J-K flip-flops is a DC reset; and the associated flip-flops are held in a reset state whenever this signal is at a ground (0 volt) level regardless of the state of the clock input. When the encoder sine or cosine input signal makes a transition to a state which results in a one (+5 volt) state at the R input, the respective flip-flop is released. The first clock pulse after the encoder signal transition will set the first flip-flop (either 508, 524, 542 or 552), which in turn enables the second flip-flop (either 510, 526, 544 or 554) to be set. If for any reason after the first flip-flop is set, the R input signal returns to the ground state, the first flip-flop is then reset and the cycle is restarted. If this does not occur, the subsequent clock pulse will set the second flip-flop enabling the derivative or Å output. The third clock pulse resets the first flip-flop and disables the Å gate, thus terminating the derivative pulse. It should be noticed that once the second flip-flop is set, it can only be reset by the signal on the R line. Also, once the A flip-flop has been set, and if the A signal were still high or on at this time, noise sufficient to cause the R line to return to ground will cause the derivative detection cycle to recur, causing a false derivative to be generated. Therefore, it is important to suppress the noise on the reset line. This is accomplished by grouping the digital differentiators in pairs for each input (for a total of 4), to allow the positive derivative signal to reset the negative derivative detector and the negative derivative output signal to reset the positive derivative detector. Therefore, the reset signal is inhibited until the opposite derivative is detected. One of the A, or sine differentiators receives the A input inverted by inverter 502, while the complementary A differentiator receives the A signal directly. A positive derivative detector 501 is reset by the second flip-flop of the corresponding negative derivative detector 521; likewise, the negative derivative detector 521 is reset by the second flip-flop of the positive flip-flop detector (on leads 503A and 503B). Therefore, in a situation where the encoder strip stopped on one of the transitions of the encoder and a noise burst occurs (where the burst has a duration longer than the clock period), the encoder will revert to the $\bar{A}$ state if it was initially in the A state. The logic of the multiplier decides that the encoder has moved backwards by one state to produce a backward count pulse. As soon as the noise signal disappears, the unit will revert to the A state producing a forward count pulse with no net change in position as far as the logic is concerned.

A more detailed analysis of the multiplier shows that the $\bar{A}$ signal input is inverted by inverter 502 providing the compliment of the $\bar{A}$ signal (or an A signal) to the gate 504 which is in turn connected by lead 506 to JK flip-flops 508 and 510. The Q output of flip-flop 508 and 510 are combined at gate 512 to form a rising (positive) edge detector (of the sine $\bar{A}$ input) having an output at lead 514. The J-K flip-flops 508 and 510 are clocked by a clock having a fixed repetition rate; the clock rate is selected to be greater than twice the highest expected (valid) sine or cosine signal rate. In this instance, the clock has either a 4.5 microsecond period or a 65 microsecond period according to whether the position multiplier is used for the back gauge or ram, respectively. This clock signal is generated according to a timer circuit 516 known to the art (typically using a #556 device) and buffered by inverters 518 and 520, whose outputs are in turn received by the clock inputs of the second flip-flops shown in FIG. 8. The negative polarity (falling) edge transition of the $\bar{A}$ signal is detected by logic gates 522 and 528 in a manner corresponding to that described above. The $\bar{A}$ input is received by a NAND gate 522. The gate 522 also receives the Q signal of flip-flop 510 of the rising edge (opposite) channel to provide a reset signal in the second channel only after the opposite (positive) polarity transition has been received and detected. This inhibits the false triggering or multiple triggering the edge detector circuits of signals as described earlier. The output of NAND gate 522 is active when at a low (or zero volt) level, as are the reset connections of the flip-flops 524 and 526. When activated, the reset signals set the Q outputs of the respective flip-flops at a low state. When in the low state, the Q outputs of the flip-flops 524 and 526 as received by AND gate 528 produce a low level or zero volt output at lead 530. Prior to the occurrence of the transition detected by the particular (rising or falling) channel, the Q output of the first flip-flop, here flip-flop 524, will be in a low state, and the second flip-flop here 526, will be in a high state producing a low output at the lead 530 from the AND gate 528. At the transition, the reset lines of the two flip-flops are set to zero causing both Q outputs to be set to a low state. This also produces a low output of the AND gate 528 at output 530. The first clock pulse thereafter produced by timer circuit 516 and inverter 518 causes the first flip-flop Q output at 532 to go to a high state. This is created by the connection of the J-K inputs being connected to high and low logic levels, respectively, as generated from the second J-K flip-flop 526. At the second clock pulse, the second flip-flop changes state from a low Q output to a high Q output. This is produced by the high level at the J input and the zero logic level at the K input for the flip-flop 526. After the second clock pulse, the Q outputs for both the flip-flop 524 and 526 are high causing the AND gate 528 to produce a high level as well. Subsequent clock pulses cause the first flip-flop 524 output 533 to be set again to a zero or low output since the J and K input signals are reversed in state, now being low and high, respectively, due to the state of flip-flop 526. This causes the output 530 of AND gate 528 to once again return to zero. Thus it is seen in this sequence that upon the initial clock pulse after the reset signal (which is the sine or A signal received from the encoder) the AND gate 528 output at 530 produces a pulse at the second clock pulse is returned to zero thereafter until a subsequent transition occurs.

The cosine or B input is received by a third and fourth channel, 539 and 549, respectively, including logic elements 540–546 and 550–556, respectively. The operation of these two channels are substantially identical to those of the channels associated with the rising and falling edge detection of the sine or A signal. The four different edge detector channels per multiplier relate directly to the rising and falling edges of both the A and B (sine and cosine) inputs. These four outputs indicated as $\dot{A}$, $\bar{A}$, $\dot{B}$, and $\bar{B}$ appearing respectively at leads 514, 530, 548 and 558 indicate the edge transitions of the above-mentioned input signals. The above-mentioned four channel outputs are logically combined by open collector NAND gates 560–574 whose outputs are grouped in groups of four, each group having a common collector pull-up resistor 576 and 578, respectively providing output signals at the output leads 582 and 580 corresponding to a rate four times greater than the sine or cosine input signals.

The NAND gate 584 has three inputs to receive a signal from outputs leads 580 and 582, and additional output from an additional NAND gate 586 cross-connected to form a flip-flop. The flip-flop formed by the combination of 584 and 586 produces a low output signal at 588 and a high output at 590 received as interrupt signals by the master processor. The signals on leads 588 and 590, once received by the main control system 400, may be reset by a low-going pulse introduced at 592 on the interrupt reset lead, as generated by the main control described above. The signals at leads 580 and 582 received by logic elements 594 and 596, which are cross-connected to form a flip-flop having an output at 598 wherein a forward encoder direction is indicated by a high logic state and a reverse direction as indicated by a low logic state. The direction signal at 598 is received by the main control unit 400, discussed above. The direction and interrupt signals formed are integrated into the main control system by techniques known in the art.

Figure 10:
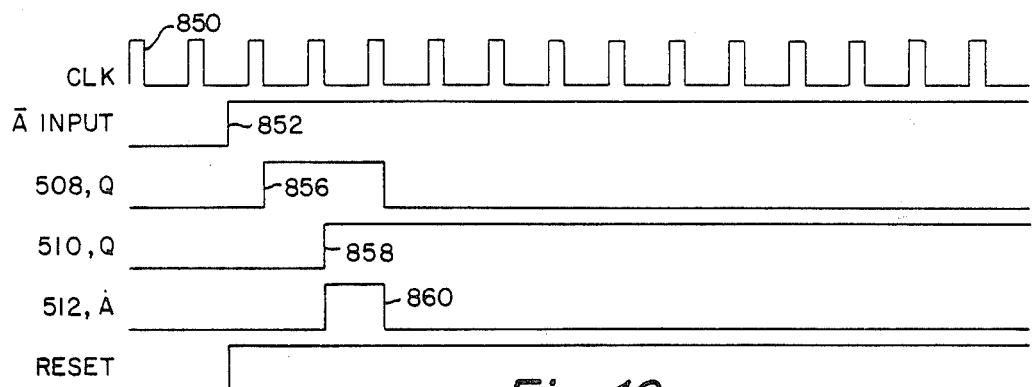
FIGS. 10 and 11 are timing diagrams for the differentiator portion of the multiplier of FIG. 9.
Figure 11:
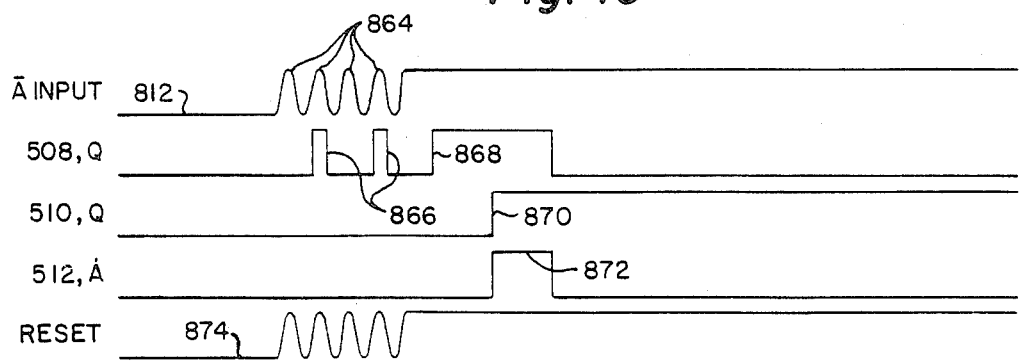

The operation of the sine and cosine input signal differentiators for both non-noisy and noisy input signals is shown in FIG. 10 and FIG. 11, respectively. The clock signal 850 comprises a periodic sequence of pulses having an interval less than one-half of the smallest expected time interval between encoder signal pulses. If an $\overline{A}$ input positive transition 852 occurs between clock pulses and a reset R signal is received from the opposite (polarity) differentiator as described above, the Q output 856 at the first flip-flop 508 becomes set on the falling edge of the next clock pulse. The Q output of the first flip-flop 508 enables the second flip-flop 510 Q output 858 to become set at the falling edge of the next clock pulse, which in turn causes the first flip-flop 508 to reset. A logical AND product of both Q outputs by gate 512 produces a single pulse 560 from the $\overline{A}$ input transition 852.

A noisy $\overline{A}$ signal 862 is received by the differentiator circuit in FIG. 11, showing multiple noise pulses 864. The coincidence of the input pulses 864 and the clock pulses 850 allow the first flip-flop 508 to become set; however, the extreme amplitude of the noise on the flip-flop reset signal 874 causes the flip-flop to be reset twice, at 866. After the noise ceases, the first flip-flop 508 is set at 868. Thereafter, the second flip-flop 510 is set at 870, producing an output pulse 872 as described above with reference to FIG. 10.

The encoder multiplier for use with the back gauge is substantially identical to that of the ram position multiplier, with the exception of the logic after the up and down signals on leads 582 and 580, respectively. This additional logic 600 is shown in detail in FIG. 9, now described. The multiplier up and down signals of the ram position multiplier shown in FIG. 8 at 582 and 580 are received by the up and down input leads labeled 582A and 580A, respectively, of FIG. 9. The up and down signals received by leads 582A and 580A are received by NOR gates 602, 606, 604 and 608 in a logical configuration to provide output signals at 610 and 612, respectively, such that the interconnection of the NOR gates 602, 604, 606 and 608 with the receive signals on leads 582A and 580A prevent a change in output signals at either 610 and 612 if both up and down pulses (on leads 582A and 580A) occur at the same time. That is, the signal on leads 610 and 612 will show single output only during a mutually exclusive logic level shift of the input signals.

In the conditions when the encoder stops on an input signal transition point making the signals at leads 610 and 612 succeptable to a rapid sequence of signals (due to mechanical jitter moving the encoder about the transition point), the main control system 400 may not be able to handle the data rate. Therefore, the signals of leads 610 and 612 are first inverted by logic components 614 and 616 and received by NAND gate 618 and J-K flip flop 620 wherein outputs produced by the J-K flip-flop at lead 622 and 624 are logically combined with logic signals on leads 626 and 628 by logic NAND gates 630 and 632 to produce up and down pulses at leads 634 and 636 only in conditions where there have been at least two consecutive pulses on either lead 610 or 612. That is, for the up signal at 634 to provide a sequence of logic pulses corresponding to the up pulses received at lead 582A, there must necessarily be at least two pulses received simultaneously on lead 582A or 610 without an intervening down signal received on lead 580A. If a down signal is received after an up signal, the J-K flip-flop 620 will be reset requiring a subsequent occurrence of two consecutive pulses on the up signal 582A. Similarly, the same effect is shown when providing down signals on lead 636. Two or more consecutive down pulses must occur on lead 580A for subsequent pulses to be transmitted through lead 636. Upon intervention of an up pulse at 582A, the flip-flop 620 will be reset, requiring a subsequent down pulse before the next down signal is passed through on lead 636. The signals are received by NAND gate 640 and 642 which are cross-coupled to create a set/reset flip-flop, whose output at 644 is a continuous signal whose level corresponds to the back gauge (position counter) direction. A forward direction is indicated by a high logic level; a reverse direction is indicated by a low logic level. Both the ram position multiplier interrupt signal on lead 590, shown in FIG. 8 and the additional circuit 600 output used in the back gauge multiplier, shown in FIG. 9 at lead 650, are received by the main control unit 400 as an interrupt shown as interrupt RST 7.5 in FIG. 9. The main control unit 400 processor will not acknowledge a position change until the signal interrupt occurs.

To prevent exceeding the I/O service capability of the microprocessor system to acknowledge the position change as indicated by an interrupt to the microprocessor system, a number of interrupts indicating an encoder position change is reduced by a factor of 16. FIG. 9 shows the use of a divide-by-16 counter 646 which counts sixteen position pulses before providing an interrupt signal on lead 650 which in turn is received and acknowledged by the processor. The main control processor system 400, upon receipt of the interrupt, resets the interrupt by a signal presented to line 652. The divide-by-16 counter 646 produces a carry pulse at lead 648 which is received by three input NAND gates 654 and 656 which are interconnected to form a flip-flop having the interrupt output at 650 as the output and including a reset from the master control unit at lead 652. In this manner, the direction reset at 650 will only be supplied upon the occurrence of a counter 646 carry-out signal at 648, which occurs only when the counter is incrementing in an up position. This interrupt indication limitation to occurances of direction pulses of greater than 16 in either direction is provided by a direction flip-flop (comprising NAND gates 660 and 662) which changes state only upon the occurrence of 16 direction pulses of a direction opposite to the preceding 16 (or greater) pulses. The direction flip-flop formed by NAND gates 660 and 662, in combination with NAND gates 680, 682, 684, 686, 696 and 704, direct all up or down pulses (for the current direction) to the counter 646 up input on lead 698. When the encoder multiplier signals change direction, the 'other' direction signals is directed to the counter 646 down input on lead 706 until the direction flip-flop (formed by 660, 662) changes state; after which time the other direction becomes the current direction and the counter 646 input again receives the direction pulses. The direction counter changes state when four zero signals exist at the output counter 646, which are detected by two OR gates 664 and 666 in combination with AND gate 668, producing the zero-detect signal at lead 670. The zero-detect signal is in turn received by NAND gates 672 and 674, whose outputs are received by the flip-flop NAND gates 660 and 662. Therefore, when the counter 646 has an all zero output, the detector lead 670 is in a high state which enables the up or down pulses on 634 or 636 to be passed through the respective NAND gates 672 and 674. For instance, if the down pulse occurs during the detection of all zeros, the down pulse on 636 will be transmitted through to the NAND gate 674 output at 676 and be received by flip-flop NAND gate 662 producing a high logic level at output lead 678 which in turn is received by NAND gate 682 and 686. However, since NAND gate 674 received the pulse from lead 636, and the flip-flop output state 678 is high, only the NAND gate 682 is able to respond to the pulses received along lead 688. The other NAND gate 686 receives the complimentary direction flip-flop output signal along lead 690, which being a low signal does not enable the NAND gate 686 to respond at the output 692. Since into NAND gate 696, the NAND gate 682 output at 694 in turn passes the down pulses originating at lead 636 through the NAND gate 696 into the up count port of the divide-by-16 counter 646, NAND gate 680 is providing a high output signal. The down pulses on lead 636 will subsequently be received through the lead 698 to the up count of the counter 646 whenever its modulus (of 16) is exceeded. If, however, the encoder changes directions and the down pulse signals are not created, rather up count pulses along lead 634 occur, the up count signal will be received by NAND gate 684 along lead 700 since the NAND gate 662 currently has the high state at the output lead 678, which is also received by NAND gate 684. The output therefrom at 702 is received by NAND gate 704 producing a pulse sequence at its output 706 received by the down counting input of counter 646. The up pulses from lead 634 will therefore cause the counter 646 to reverse the count direction and count down to zero to reset the direction flip-flop as described above when the down count exists through a condition of all zeros at counter 646 outputs, the zero-detect lead 670 again is in a high state, enabling gate 672 to transfer the upcount to flip-flop NAND gate 660 to invert the output state thereof. This in turn disables the NAND gate 684 and enables the NAND gate 680 which in turn passes the up count pulses to through lead 708 into NAND gate 696 and again to up count input through lead 698. This once again causes the counter 646 to increment upward, producing a carryout on lead 648 when its modulus is exceeded, which in turn causes the reset signal along 650 to indicate that sixteen such up count pulses have been generated. The direction of the count sequence, that being either an up or down count, is indicated earlier by the direction signal on lead 646 also received by the master control unit. The main control system 400 may also bypass the counter 646 to receive a position pulse for every pulse generated, in a 1:1 relationship by providing an active (low) signal on the Y1SEL lead 691. The NOR gate 693 allows either the up or the down signal pulses, combined by NOR gate 687 and later inverted by NAND gate 695, to activate the interrupt flip-flop (formed from NAND gates 654 and 656) in the same manner as the counter 646 carry-out.

The main control unit 400 also receives signals from the safety circuit 700 shown in FIG. 12 to set off system alarms whenever an absolute safety ram position and an adjustable ram bottom position is exceeded. In addition to the position signal derived from the above-mentioned position encoders, the absolute position of the ram is also determined according to an analog voltage derived from an externally mounted linear position transducer (142 on FIG. 1) whose output tap (wiper) 731 location corresponds to the position of the ram. This output tap 731 or alarm position signal is received on lead 732 through a filter network comprising resistors R1, R2 and capacitors C1, C2 to substantially remove any high frequency (noise) signal from the analog position input signal. This analog position signal is received on lead 734 by the positive input of adjustable position comparator 724 and the negative or inverting input of comparator 726, to be measured relative to threshold voltages determined by two resistor dividers R5, R6, R7 and R3, R4, respectively, connected to a reference voltage source 791. Each resistive divider provides a voltage corresponding to an absolute position of the ram via the analog input voltage. Each voltage divider threshold voltage corresponds to a position beyond which the ram is not permitted to travel. Changes in the ram bottom absolute limit are provided by adjustment of R7. When the comparators 724 and 726 output signals indicate the position of the ram being in excess of a predetermined safety margin, a safety flag signal occurs on lead 720. The safety flag signal is created by NAND gate 722 whenever either comparator 724 or comparator 726 produces a low signal on output leads 728 or 730, respectively.

The additional adjustable safety ram bottom alarm included allows the operator to adjust a threshold to correspond to the ram bottom position including the die, punch and workpiece thickness. Due to the frequent changing of the die and complementary punch pieces (within the jaws of the ram) it is desirable to adjust the ram limit quickly and easily. First the ram is moved to its minimum distance, including the workpiece thickness as described above in the operation of the display unit system 200. The ram alarm position signal from the alarm position potentiometer output tap 731 corresponding to this minimum position is stored as a threshold signal which is then compared to subsequent analog input signal at 734. Whenever the ram position signal at 734 exceeds the stored threshold signal, an alarm signal is produced at 737. The adjustable threshold signal is implemented by a digital counting circuit 764, 766 and 768 connected to a digital-to-analog converter 790 whose output is then received by a third comparator 736, which also receives as an input the input signal at 734. The digital count circuit is reset at the occurrence of a ram bottom signal at 738, indicating the minimum position of the ram, with the metal to be bent in place. The signal at 738 in turn resets all associated circuitry. Next, the digital counters 764, 766 and 768 are then allowed to count upwards causing the analog reference voltage from the digital to analog converter (DAC) 790 and amplifier 786 output at 772 to increase from a minimum to a voltage substantially equal to the analog input at 734 at that time. When the voltages received by comparator are substantially equal, the digital counting sequence is inhibited and the count value is maintained until a subsequent ram bottom signal is received, which resets the counters. Specifically, the ram bottom signal at 738 releases the reset input in the flip-flop circuit allowing the flip-flops 740, 742, 744 and 762 as well as counters 764, 766 and 768 to be enabled for counting on subsequent clock signals. A clock circuit comprising amplifier 746 and resistors R8, R9, R10 and R11 as well as capacitor C3 connected in a manner to form an oscillator known to the art provides an output clock signal at lead 748 which is received by flip-flops 740, 744 and NAND gate 750.

The combination of the digital counter circuitry and the associated analog conversion circuitry is configured to overcome the generation of erroneous signals when the flip-flops and counters are reset. Before the circuit is reset, the DAC 790 is typically producing an output signal for the previously selected safety ram bottom position. The reset to zero of the counters 764, 766 and 768 may cause a large swing in DAC output signal. It is characteristic of DAC circuits to require finite time for the output to settle at a signal corresponding to the digital input thereof. If the counters are incremented before the DAC output has settled, the DAC output signal corresponding to the lowest digital inputs may never be reached. The circuit 700 of the present invention delays the onset of the counter increment by extending the period of the counter reset. The reset period is extended by first resetting counter 764 and flip-flop 762. The J-K flip-flops 740 and 742 in combination with NAND gate 758 causes the counter 764 and flip-flop 762 to be reset for one clock period. The reset flip-flop 762 clears counters 766 and 768, and also flip-flop 744. The $\overline{Q}$ output of flip-flop 744 enables NAND gate 750 to pass the clock signal to counter 764. Counter 764 counts through one cycle (16 pulses) after which its most significant bit (also connected to counter 766) causes flip-flop 762 to change state. The Q output of counter 762 goes to a high state releasing counters 766 and 768 to count up until the analog threshold is reached according to a change of comparator 736 output. The comparison of the DAC 790 analog signal on lead 722, through resistor R12, and the analog ram position voltage from lead 734 by the comparator 736 produces an output signal on lead 737.

Additionally, resistor R13 provides an alternate path to a variable resistor R14 connected to comparator 774 output at 776 to provide a ram offset adjustment. The comparator 774 output 776 signal, being initially in a low (zero) voltage state as a result of its inputs on leads 778 and 780 being connected to the Q and $\overline{Q}$ outputs of flip-flop 744 (which were initially set to 0 and 1 states, respectively) changes to a high (1) state upon the occurrence of the first clock period after the clear signal on lead 782 changes from a 0 to a 1 state. The high (1) level of the signal on lead 782 occurs after counter 764 counts through a sequence of 16 clock pulses (after the ram bottom signal 738 goes low). Furthermore, the circuit containing comparator 736 contains a small amount of hysteresis due to the resistor R15 inserted between the output at lead 737 to the positive input at 784. Therefore, the operation of the digital counters increment from a value of all zero levels to a number sufficient to cause the analog signal (at 772 from amplifier 786) to cause comparator 736 to change state, which in turn causes the J input of the flip-flop 744 to rise to a 1 level. The flip-flop 744 thereafter changes the outputs on leads 780 to a low level, thus inhibiting the NAND gate 750 from transmitting the clock signal on lead 744 through lead 788, which then stops the incrementing of counters 764, 766, and 768. The counter outputs are received by digital to analog converter 790 in combination with amplifier 786. The outputs no longer being incremented provide a constant analog output level at 772. After operation in this manner, the safety circuit is now preset to a predetermined ram bottom position. Subsequent operation of the ram to a position in excess or out of the range of tolerance as determined by the ram offset adjustment R14 and the hysteresis introduced by resistor R15 will cause an overextension signal on 737 to occur, in turn sounding the appropriate alarms according to the operation of the main control unit 400.

Additional safety circuits include a system power down indicator comprising amplifier 792, resistors R20, R21, R22, R23, R24, capacitor C5, and reference diode D1. These are connected to establish a high output on lead 794 whenever the +15 volt signal on input lead 796 and the +8 volt signal on lead 798 are below and above their respective nominal voltages supplied by system power supplies (not shown).

Figure 7:
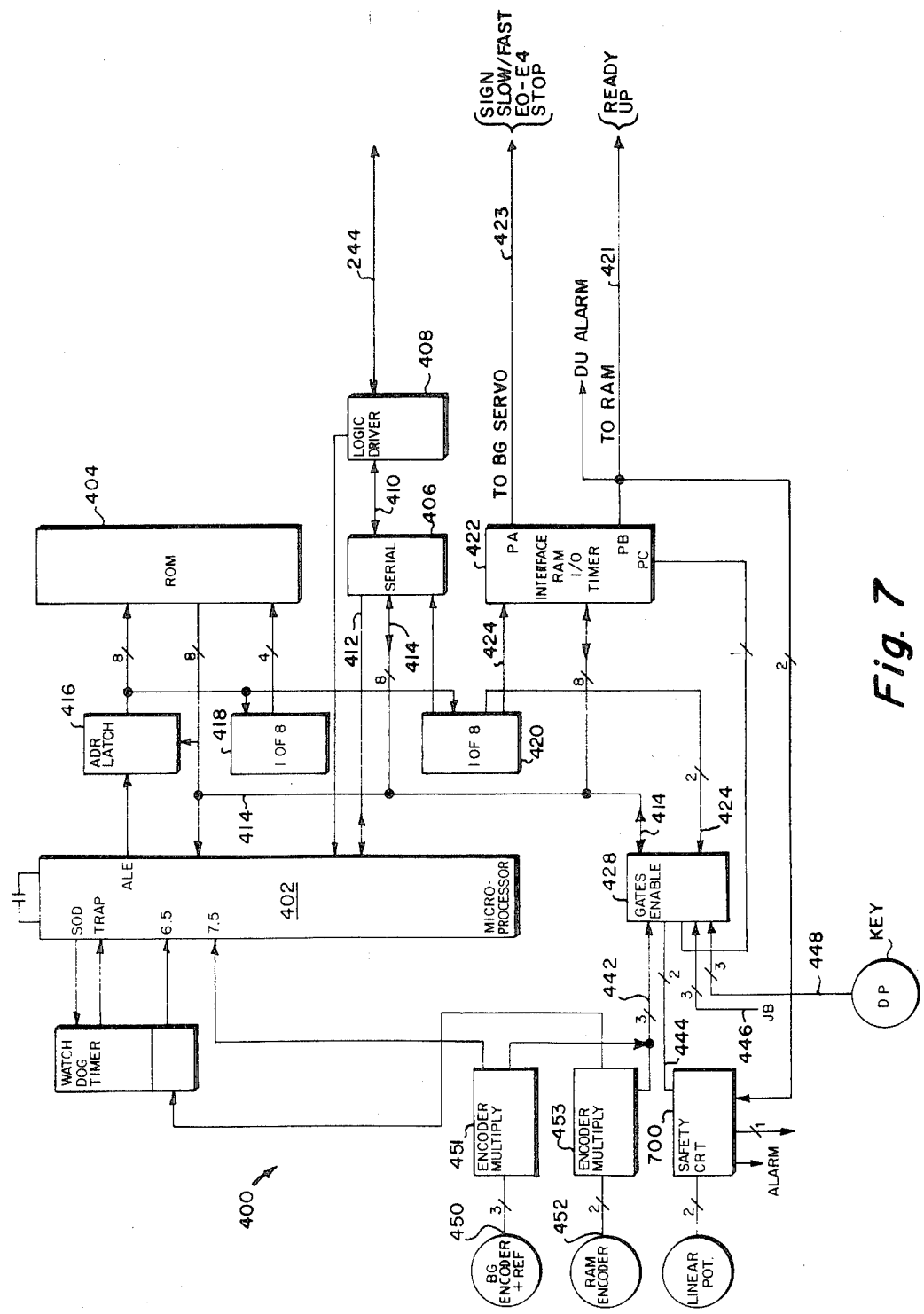
FIG. 7 is a block diagram of the main control processor system.

The main control unit processor system 400 shown in FIG. 7 controls the ram position and the back gauge position. The main processor system is programmed to the position encoder signals, derived and conditioned as described above, so that the corresponding electrical, mechanical, and/or hydraulic control devices control the particular back gauge and press brake in a manner to produce the desired machinery movements. In particular, the main control system 400 includes the system control capabilities for back gauge control as described in U.S. Pat. Nos. 4,089,200 and 4,115,859 incorporated by reference. Furthermore, the main control system 400 includes capabilities of controlling the press brake ram position by programming the system 400 according to the particular actuator signals received and position indicating signals produced therein. The general and detailed general manner of programming the logic circuitry of the main system 400 is not part of the present invention and such is within the incorporated patents and the scope of those skilled in the art.

However, since the present invention is applicable to existing mechanical systems having individually different and varying mechanical specifications and behavior and in particular, the distance over which the ram adjustment will "coast" due to inertia, an improvement above the current control system techniques is necessary. The present invention improves ram positioning control according to the RAMPOST subroutine 900 of FIG. 13 and the weighted error averaging ADDAV subroutine 950 of FIG. 14, to be used in combination with a position control system. The particular control system includes the main control system 400, described above, but is not limited thereto. Moreover, the improved control system now described is not limited to the ram control portion of the press brake, but may also be applied more generally to other mechanical and/or hydraulic systems having individually different and varying (over a period of time) position location characteristics.

Figure 13:
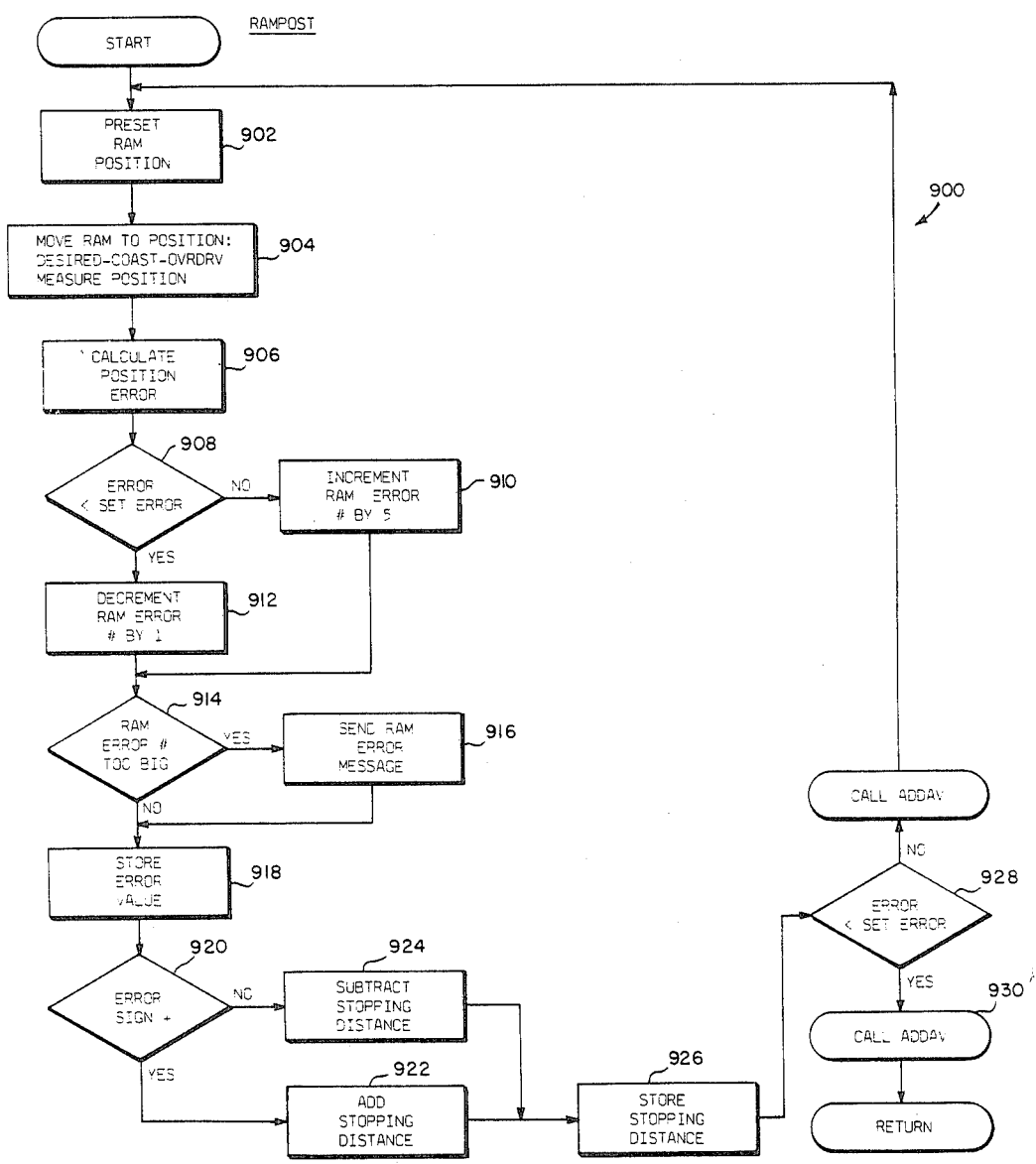
FIGS. 13 and 14 are flow charts of the RAM POST and ADDAV subroutines used in the main control system of FIG. 7.

The RAMPOST subroutine 900 in FIG. 13 receives the derived ram position signal from preceeding system program sections, and provides accurate positioning of the ram extension to within a specified error value. The RAMPOST subroutine 900 continuously monitors and updates the system correction factors according to any changes in the mechanical system performance due to wear, temperature changes, etc. The first step 902 presets the ram to a reference position. Next, the ram extension is adjusted by energizing the adjusting motor (113 in FIG. 2) for a duration appropriate to adjust the ram extension to the desired value. However, the mechanical inertia of the motor and the interconnecting mechanical linkages, together with the added adjustment uncertainty due to gear lash, drive belt stretch and other factors, require the value of the desired ram position to be compensated by a COAST factor, in step 904. Also, the actual ram position is measured, and the corresponding signal is received. The difference between the desired position and the actual position is compared to form an error signal at step 906. If, at step 908, the error is not less than a set error value, a ram error number is incremented by 5 in step 910. Otherwise, the ram error number is decremented by 1 at step 912. If the ram error number is too big, that is it exceeds a predetermined value at step 914, an error signal is sent to the operator via the front panel displays at step 916. Thereafter, at step 918 the error value determined in step 906 is stored in a register or memory location. If the sign of the error signal is positive at step 920, the error is added to the stopping distance at step 922; if the sign is not positive, the stopping distance is subtracted at step 924. Thereafter, the stopping distance is stored in step 926. Again at step 928 the error value is compared to the set error value. If the error is less than the set error value, the ADDAV subroutine 950 is called at step 930, and the RAMPOST subroutine is complete for that particular ram positioning sequence. If the error is not less than the set error value at step 928, the ADDAV subroutine 950 is called at step 923; thereafter, the RAMPOST subroutine returns to step 902 to retry the positioning sequence therein.

Figure 14:
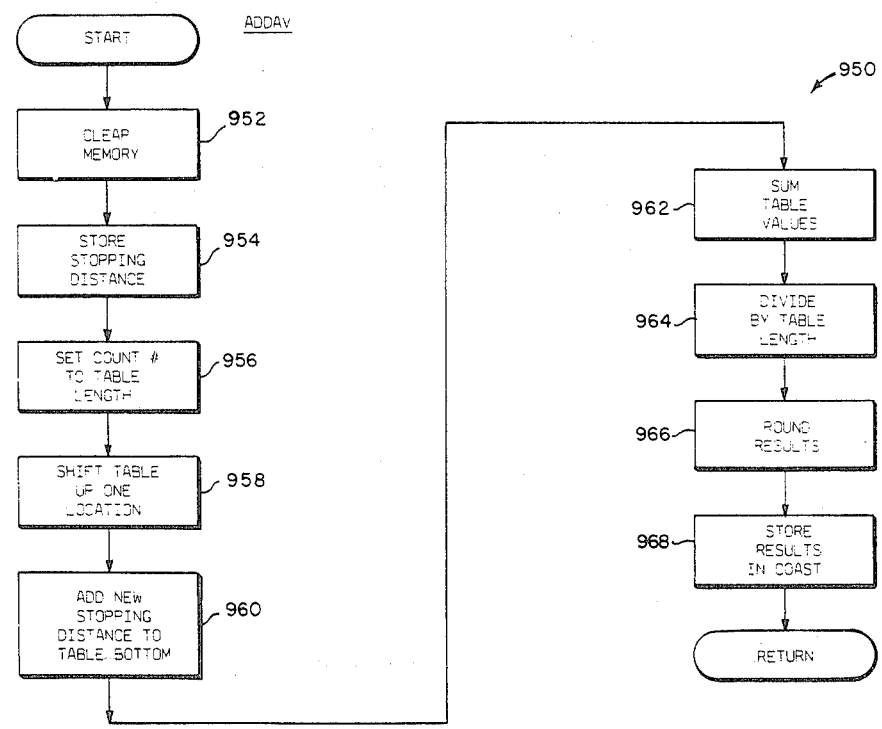

The ADDAV subroutine 950 shown in FIG. 14 provides a running average of the coast correction signal (COAST). The average includes a predetermined number of the most recent error values arranged in a table format. Specifically, the ADDAV subroutine first clears the temporary memory area to be used, at step 952. The stopping distance is stored at step 954. A count number is set for the error table length at step 956. Next at step 958, the contents of the error table (which includes the error values from the previous call of ADDAV) are shifted one location up the table. The newest stopping distance is added to the bottom location of the table at step 960. The values within the table are summed at step 962 and thereafter divided by a number equal to the table length (from step 956) at step 964. The results are rounded in step 966 and stored in the COAST variable location in step 968. Thereafter, the ADDAV subroutine returns to the RAMPOST subroutine, described above.

Figure 15:
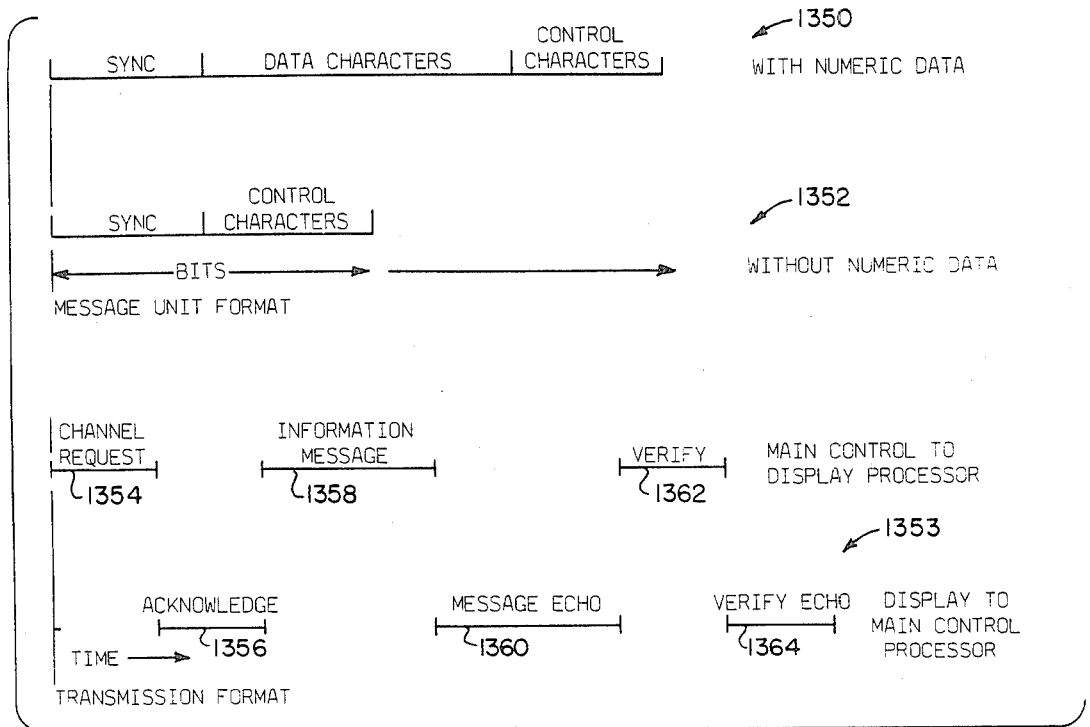
FIG. 15 shows data bit and timing format for data channel communications.

The interprocessor communication channel data format is shown in FIG. 15 wherein the format of the message units with numerical data is labeled 1350. When the message units do not include numerical data, the format of the message unit is shown by 1352. The handshaking or message unit communication sequence, between the main control and the display systems, is shown also by the sequence 1353. When the main processor system has data to transfer to the display processor, the main processor issues a channel request 1354, to be followed by the display processor to main controller acknowledge 1356. Thereafter, the information is passed from the controller to the display system in time zone marked 1358 and echoed by the processor to the controller during the period 1360. A verify signal is then sent from the controller to the display processor during time interval 1362 and returned from the display processor to the controller by echo verify shown in sequence 1364. Included in the control character of the message unit shown in FIGS. 1350 and 1352 are the sync and control character codes shown now in Table 3.

TABLE 3

| 44 | Sync Character | 1E | Ram Switch Sequence Error |
|----|---|----|---|
| 40 | Acknowledge/Channel Request | 1F | Backgauge Error |
|  |  | 20 | CP Ready |
| 42 | TBR Character | 21 | Depth Dimension |
| 43 | TBR Acknowledge | 22 | Retract Delay |
| 45 | Idle Character | 23 | Backgauge Dimension |
| 14 | Communication Error | 24 | Retract Switch Number |
| 11 | Decoder Error | 25 | Disable Safety Circuit |
| 16 | Initialize | 26 | Go To Idle |
| 12 | Ram Positioning Fault | 28 | Cycle Count |
| 1A | Servo Offset | 29 | Calibrate |
| 1B | Safety Fault | 2B | Ram Bottom |
| 1C | Communication Overrun Fault | 2D | Record Depth & Die Top |

When the display processor uses the communication channel to move data to the main control system, the sequence can be inverted, with the exception that the display processor does not make a channel request nor await a request acknowledge.

Figure 16:
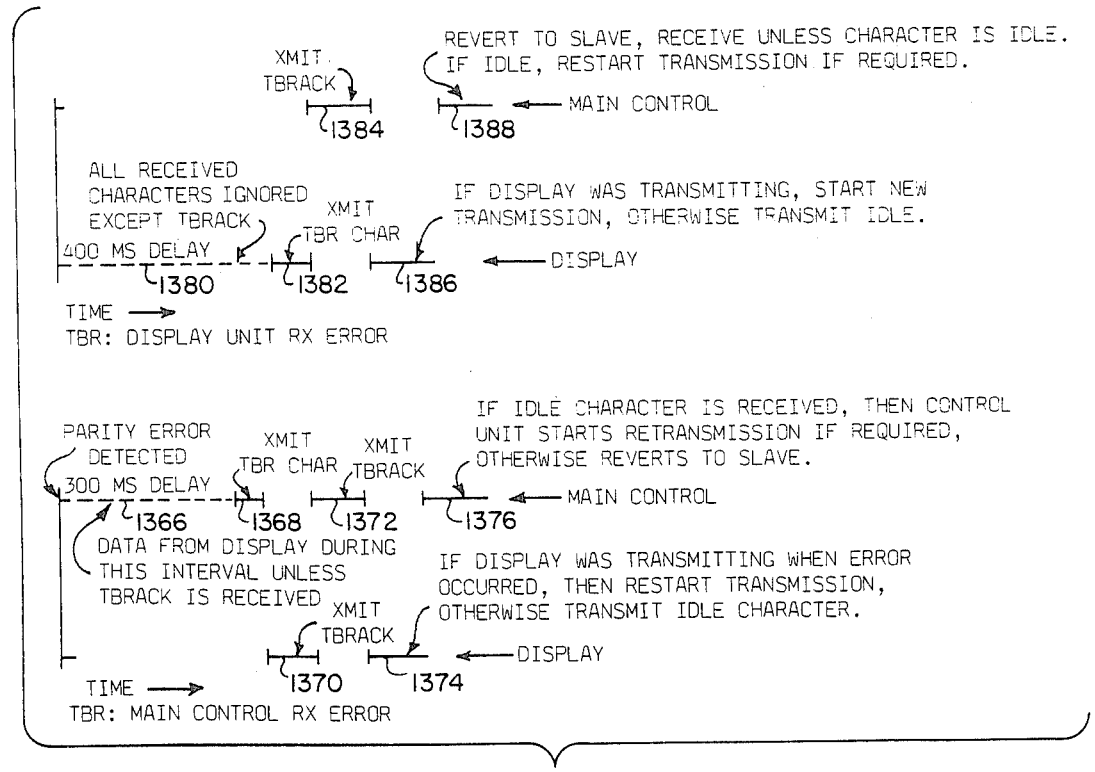
FIG. 16 is the timing diagram of the TBR program sequence.

In the event that the controllers simultaneously receive signals on the communications channel, a TBR operation mode is initiated. The TBR format shown in FIG. 16 defines operation when such errors are detected within the transmission channel or signal sequencing format communication errors are detected. When the signals are read from the communication line showing a parity error, the main control processor initiates action after a 300 millisecond delay marked 1366, which transmits a special TBR character. Upon receipt of the TBR character, the display processor sends back a TBRACK 1370, or TBR acknowledge, signal. Thereupon, the controller returns a TBRACK signal at 1372. If the display processor was transmitting when the error occurred, then the transmission is restarted at 1374, otherwise an IDLE character is transmitted by the display processor 1376. If the IDLE character is received, then the controller restarts transmission at 1376 if required, otherwise, it reverts to a slave position and receives. TBR operation is also shown for conditions when the data processor receives an error condition. Under this condition, after the parity error is detected, a 480 millisecond delay is begun in the display unit during the period labelled 1380. Thereafter a TBR character is transmitted via the display processor at 1382. The TBRACK, or TBR acknowledge, signal is transmitted by the controller at 1384. If the display processor was transmitting, the new transmission is started at 1386, otherwise, an IDLE character is transmitted. The controller reverts to a slave mode and receives unless the character is an IDLE character. If the character is an IDLE character, the transmission is restarted at 1388 is required. Under conditions wherein a noise burst on the communications channel is received by both the main processor and the display processor, and interpreted by each as an attempt to communicate by the other, the above-described sequence is then invoked to resolve the nature of the signal as originating from neither the main processor, nor the display processor.

Within each processor system (200 of FIG. 5, 400 of FIG. 7), communications are established by a hardware interrupt which requires a service subroutine and a return or exit control subroutine. The interrupt subroutine of FIG. 17 comprises a hardware [Intel 6.5] interrupt which, according to block 1392, disables the other interrupts INTS and stacks the registers and sets the CHANBSI variable to a 1 state. In addition, the interrupt status is stored and stores the USART status (the universal synchronous/asynchronous receive transmit circuit) in block 1392. In block 1394, it is determined whether or not the interrupt is a receive interrupt. If it is not a receive interrupt, the TRSMT transmit program is called. If it is a receive interrupt, the USART status is checked for an OK status (ready, no error) condition in block 1396. If the status is not OK, indicating a fault in the communications, the TBRIA subroutine discussed below is called; upon execution of the subroutine, the program returns to the CRETURN subroutine discussed below. If the USART status is OK according to the decision of block 1396, the receive subroutine is begun.

The CRETURN subroutine shown in FIG. 18 prepares the processor system to return to the normal operations of the programs which were in the process of execution before the communications interrupt occurred. This subroutine is entered by all other communications subroutines. The first step is to check to see if the channel is busy by determining whether the CHANBSY variable has a 1 state according to block 1398. If the CHANBSY variable is not 1, the TCHANBS variable is checked for a 1 state in block 1400. If it is not equal to 1, the CHANIBS variable is set to 0, and the USART TXRDY status is read in block 1402. If the CHANBSY variable is equal to 1 or the TCHANBS variable is equal to 1, the program directly goes to step 1404. Next, the TXRDY variable is checked for a state of 1 block 1406; if not equal to 1, the program loops back through block 1404. When it is equal to 1, the instructions (INTS) are restored, the registers are unstacked, and the INTS is enabled according to block 1408. Thereafter, the system returns to main program execution.

Figure 19:
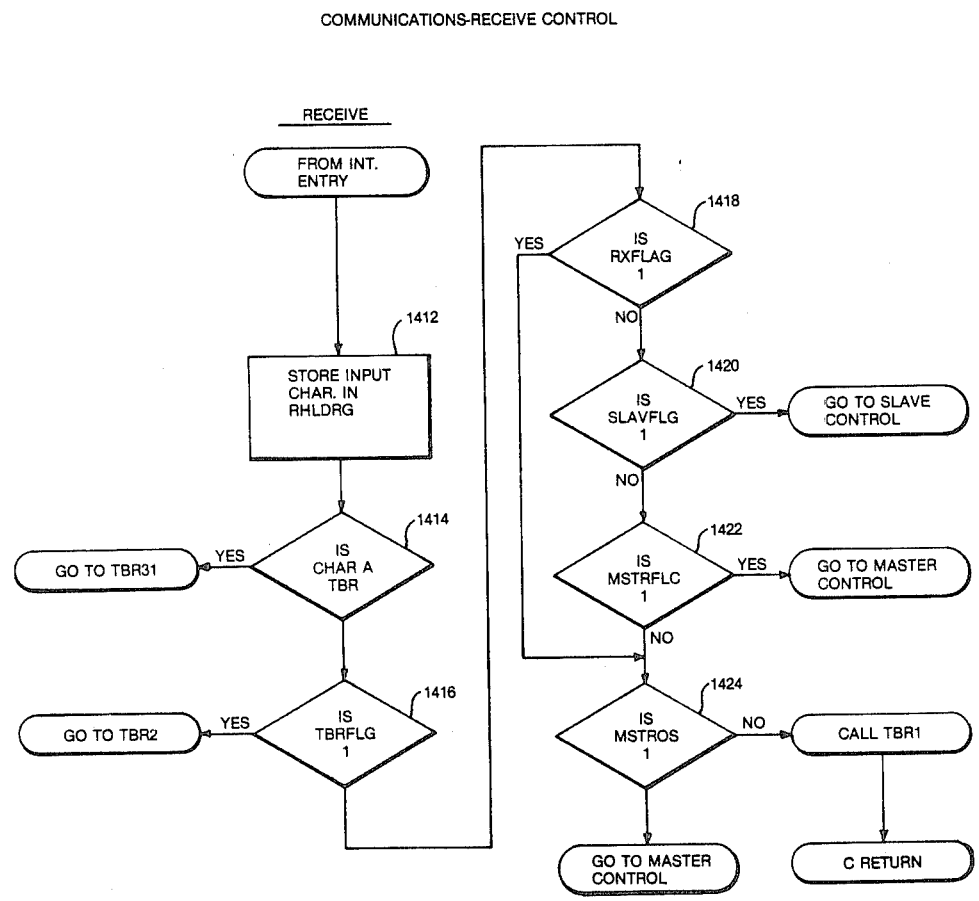
FIG. 19 is the flow chart of the RECEIVE subroutine.

The receive subroutine is shown in FIG. 19. The program begins from interrupt entry described after block 1396 shown in FIG. 17, discussed above. The first step in the receive program is to store the input characters in the RHLDRG variable according to block 1412. Thereafter, the character is tested for a TBR value indicating a communication error in block 1414. If it is a TBR variable, the program then moves to the TBR 31 subroutine discussed below. If it is not a TBR character, the TBR flag is checked for a value of 1 according to the TBRFLG variable in block 1416. If it is equal to 1, the program moves to subroutine TBR 2, discussed below. Next, the receive flag according to variable RXFLAG is compared to a 1 state in block 1418, whereupon if it is not equal to 1, according to variable SLAVFLG, the slave flag is next compared to 1 in block 1420. If it is equal to 1, the program moves to slave control subroutine, discussed below. If it is not equal to 1, the master flag, according to variable MSTRFLG, is compared to a value of 1 in block 1422. If it is equal to 1, the program moves to the master control program discussed below. If the MSTRFLG variable is not equal to 1, or if the RXFLAG variable is equal to 1 according to block 1418, the program enters the block 1424 wherein the MSTRDS variable is compared to a state of 1. If it is not equal to 1, the TBR 1 program is called, whereupon execution the program enters the CRETURN routine discussed above and shown in FIG. 17. If the MSTRDS variable according to block 1424 is equal to 1, the master control program is entered.

Figure 20:
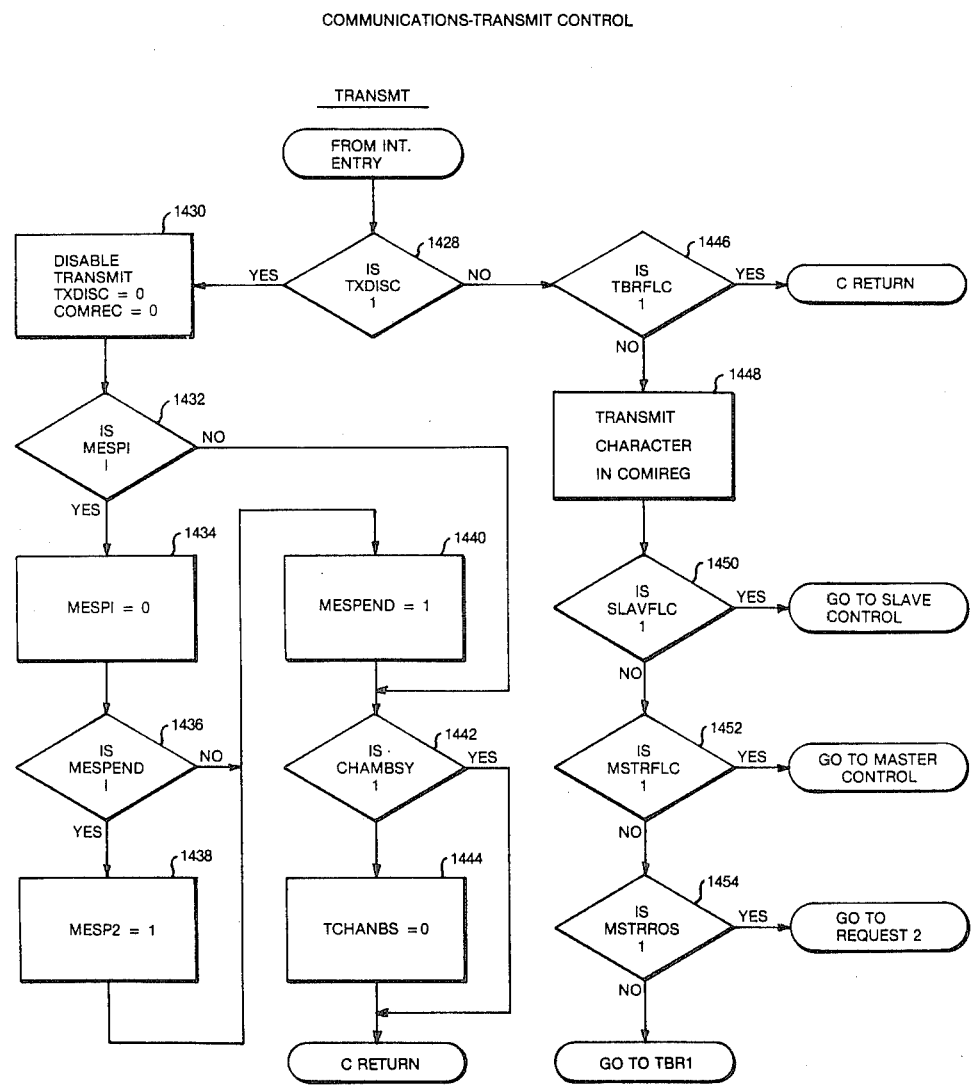
FIG. 20 is the flow chart of the TRANSMIT subroutine.

The TRNSMT, or transmit control, program is shown in FIG. 20. The TXDISC variable is checked to see if it has a value of 1 in block 1428. If it does, the transmit is disabled, and the TXDISC variable and the COMREG variable are both set to a value of 0 in block 1430. The MESP 1 variable is checked for a value of 1 in block 1432. If equal to 1, the MESP 1 variable is set to a value of 0 in block 1434. The MESPEND, or message pending, variable is checked for a value of 1. If it is equal to 1, the MESP 2 variable is set to a value of 1. Thereafter, or if the MESPEND variable is not equal to 1, the MESPEND variable is set to a value of 1 in block 1440. Thereafter, the CHANSBY, or channel busy, variable is checked for a value of 1 in block 1442. If it is not equal to 1, the TCHANBS variable is set to 0 in block 1444, and the program enters the CRETURN program discussed above. If the MESP 1 variable is determined to be not equal to 1 in block 1432, the program then directly enters block 1422. If the CHANBSY variable in block 1422 is determined to be equal to 1, the program then directly enters the CRETURN subroutine. If the TXDISC variable is not equal to 1 according to the decision in block 1428, the TBRFLG, or communications error indicator, is checked for a value of 1 in block 1446. If it is equal to 1, the program then enters the CRETURN subroutine. If the TBRFLG does not equal 1, the character in the COMIREG is transmitted according to block 1448. Next, the SLAVFLG variable is checked for a value of 1, which indicates the mode of the processor to be that of a slave position. If it is equal to 1, the slave control program is entered. If the SLAVFLG does not equal 1, the MSTRFLG, or master control flag, is tested in block 1452 for a value of 1. If it equals 1, the program enters the master control subroutine. If the flag does not equal 1, the MSTRRDS subroutine is checked for a value of 1 in block 1454. If it equals 1, the program enters the REQUEST 2 subroutine (not shown). If the MSTRRDS variable does not equal 1, the program enters the TBR 1 subroutine.

The first subroutine discussed is the SSTEP 0 subroutine shown in FIG. 21, which begins from a vector from the slave. The TBRCTR variable is set to the ERRLIM variable value; the TBR1CT, the CHANSBY, and the TBR1ST variables are set to 0, 1, and 1 states, respectively, according to block 1458. Next, the MESLD program is called. Upon return, the MESLDFL variable is interrogated for a value of 1. If it is not equal to 1, the CRETURN program is entered. If it is equal to 1 according to the test of block 1460, the MESLDFL and the TBRIST variables are both set to a value of 0 in block 1462. Next, the SLAVINC program (FIG. 23A) is called. Upon execution and return, the last character is loaded to the THLDREG variable, and the control variable is placed in the RXBUFRG character according to block 1464. Finally, the SSTEP 1 subroutine is entered, now described.

The SSTEP 1 of FIG. 22 subroutine calls the UNLOAD subroutine, which, upon return, causes the program to set the RXFLAG to a 0 state in block 1466. Next, the MESTX program is called. When the program returns, the TXCOMP variable is checked for a value of 1 in block 1468. If it is not equal to 1, the program moves to the CRETURN subroutine, described above. If the TXCOMP variable is equal to 1, the SYNC 2FL, the TBRICT, and the TXCOMP variables are set to a value of 0; also, the TBRIST and the RXFLAG variables are set to a value of 1 in block 1470. Thereafter, the SLAVINC program is called. Upon return, the program now calls the CRETURN program.

The SSTEP 2 subroutine shown in FIG. 23 is entered from a vector from the slave program. First, the VERFY subroutine is called. Upon return, the VERFLG variable is tested for a value of 1 at block 1472. If it does not equal 1, the program enters the CRETURN routine, discussed above. If it is equal to 1, the VERFLG, the CHANBSY, the SLAVCNT, and the TBRIST variables are all set to a value of 0; and the MESP 1 variable is set to a value of 1 in block 1474. Thereafter, the program enters the CRETURN subroutine.

The SLAVINC subroutine of FIG. 23A loads the address of the SLAVCNT variable, adds 3, and then stores the address of the SLAVNCT according to block 1476. Thereafter, the program returns.

Figures 24, 25:
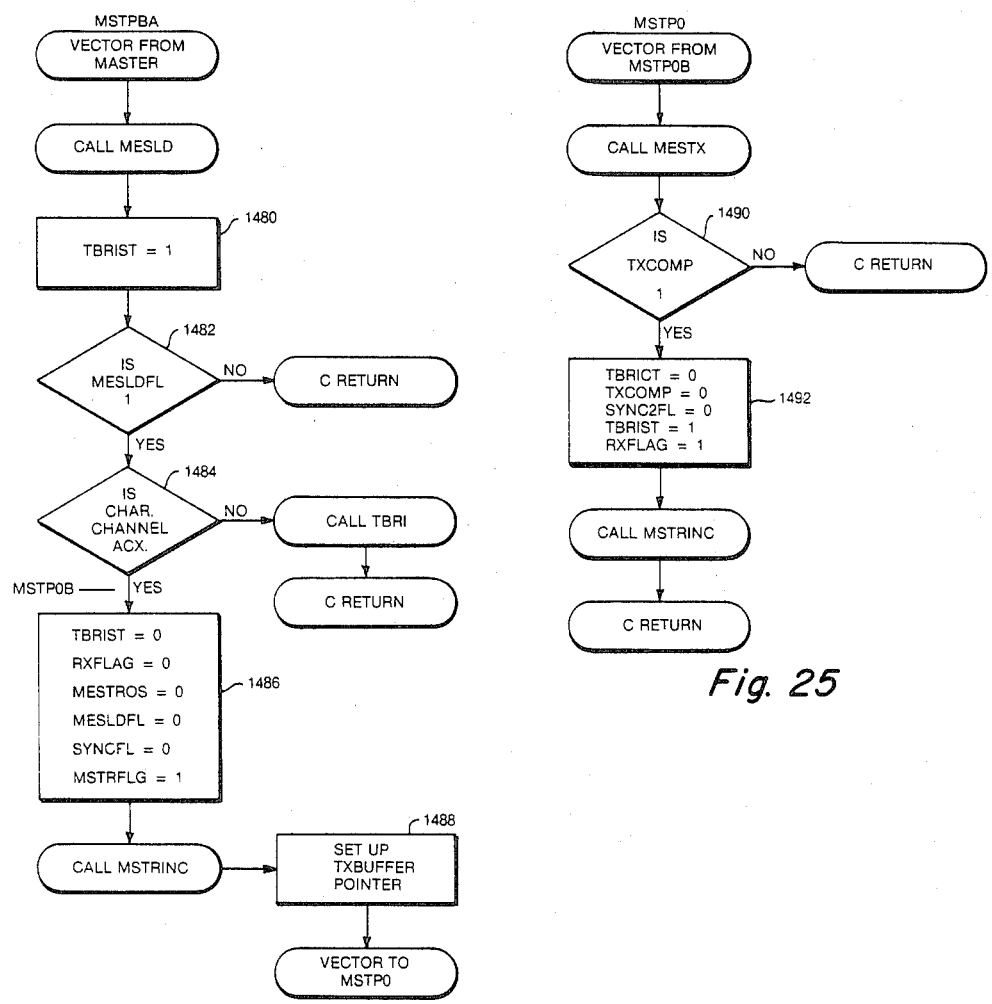
FIG. 24 is the flow chart of the MSTP 0 A subroutine.
FIG. 25 is the flow chart of the MSTP 0 subroutine.

The MSTP 0A subroutine is now shown in FIG. 24. The subroutine MSTP 0A is entered from a vector from the master program (not shown). First, the MESLD program is called; upon return, the TBRIST variable is set to 1 according to block 1480. Next, the MESLDFL variable is tested for a value of 1 in block 1482, whereupon if not equal, the program enters a CRETURN subroutine. If the MESLDFL variable is equal to 1, the character channel acknowledge is tested in block 1484. If it has been acknowledged, the TBR 1 subroutine is called; upon return, the program enters the CRETURN. If the acknowledge has been provided, the variables TBRIST, RXFLAG, MSTROS, MESLDFL, and SYNCFL are set to a 0 state, and the MSTRFLG variable is set to a 1 state in block 1486. Thereafter, the MSTRINC subroutine is called. Upon return, the transmit buffer pointer is set up according to block 1488, and the program now vectors to subroutine MSTP 0, discussed below.

The MSTP 0 program shown in FIG. 25 first calls the MESTX subroutine. Upon return, the TXCOMP variable is tested for a value of 1 in block 1490. If not equal to 0, the program moves to the CRETURN subroutine, discussed above. If the TXCOMP variable is equal to 1, the TBRICT, TXCOMP, and SYNC 2FL variables are set to 0, and the TBRIST and RXFLAG variables are set to 1, according to the function within block 1492. Thereafter, the MSTRINC subroutine and the CRETURN programs are called.

The MSTP 1 subroutine of FIG. 26 is entered from the MSTP 0 subroutine, discussed above. First, the MESLD program is called. Upon return, the MESLDFL variable is checked for a value of 1 according to block 1496. If not equal to 1, the program moves to the CRETURN discussed above. If the variable MESLDFL is equal to 1, the MESLDFL, the TRBICT, and the SYNCFL variables are all set to 0 value according to block 1498. Next, the MSTRINC program is called. Upon completion, the program begins the MSTP 2 program discussed below.

The MSTP2 program shown in FIG. 27 first calls the MESSCMP subroutine. Next, the MSTRINC subroutine is called. Thereafter, the program moves to the MSTP 3 program.

The MSTP 3 of FIG. 28 program first calls the TVERF subroutine. Upon return, the TFLVER variable is tested for a value of 1 according to block 1500. If not equal to 1, the program moves to the CRETURN subroutine. If it is equal to 1, the following variables are set to a value of 0: the MSTRCT, the TBRIST, the TFLVER, the SYNC 2FL, the SYNCFL, the TXFLAG, the CHANBSY, and the SLAVCNT variables. The RXFLAG variable and the SLAVFLG variable are set to a value of 1, all according to the functions of block 1502. Thereafter, the program enters the CRETURN subroutine.

Figure 29:
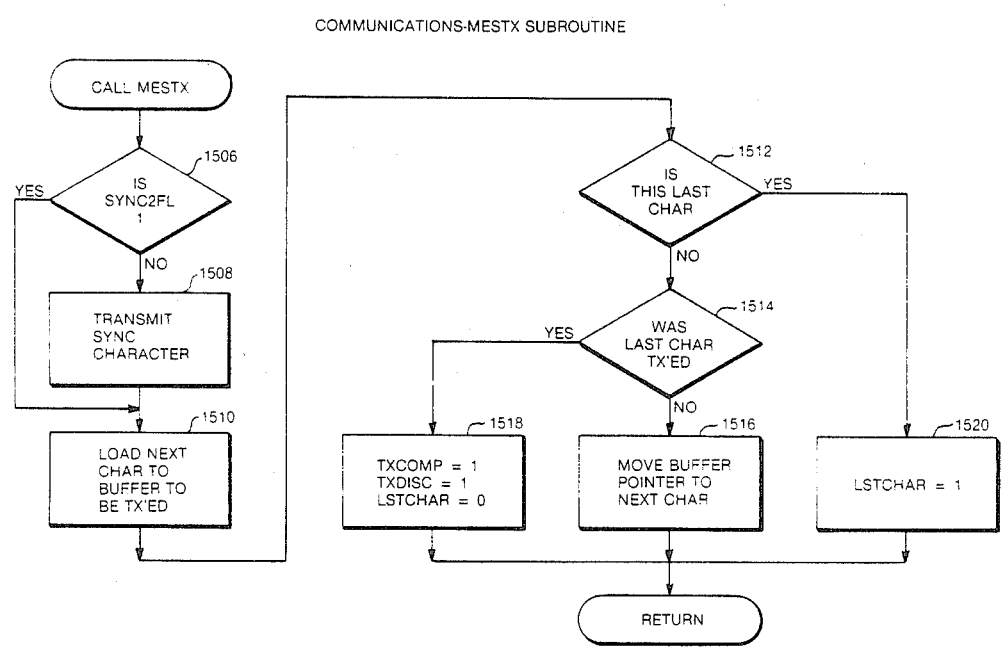
FIG. 29 is the flow chart of the MESTX subroutine.

The MESTX subroutine is shown in FIG. 29. First, in block 1506 the SYNC 2FL variable is tested for a value of 1. If it is not equal to 1, the sync, SYNC, character is transmitted thereafter; or, if the SYNC 2FL variable is equal to 1, the next character is loaded into the buffer to be transmitted according to block 1510. The characters are examined according to block 1512 as to whether this is the last character. If it is not, it is determined in block 1514 whether the last character was transmitted. If it was not, the buffer pointer is moved to the next character according to block 1516. If it was the last character transmitted, the variables TXCOMP and TXDISC are set to a value of 1, and the variable LSTCHAR is set to a value of 0 according to block 1518. If the character is the last character as decided in block 1512, the variable LSTCHAR is set to 1, according to block 1520. After blocks 1516, 1518, and 1520, the program returns to the routine which called it.

Figure 30:
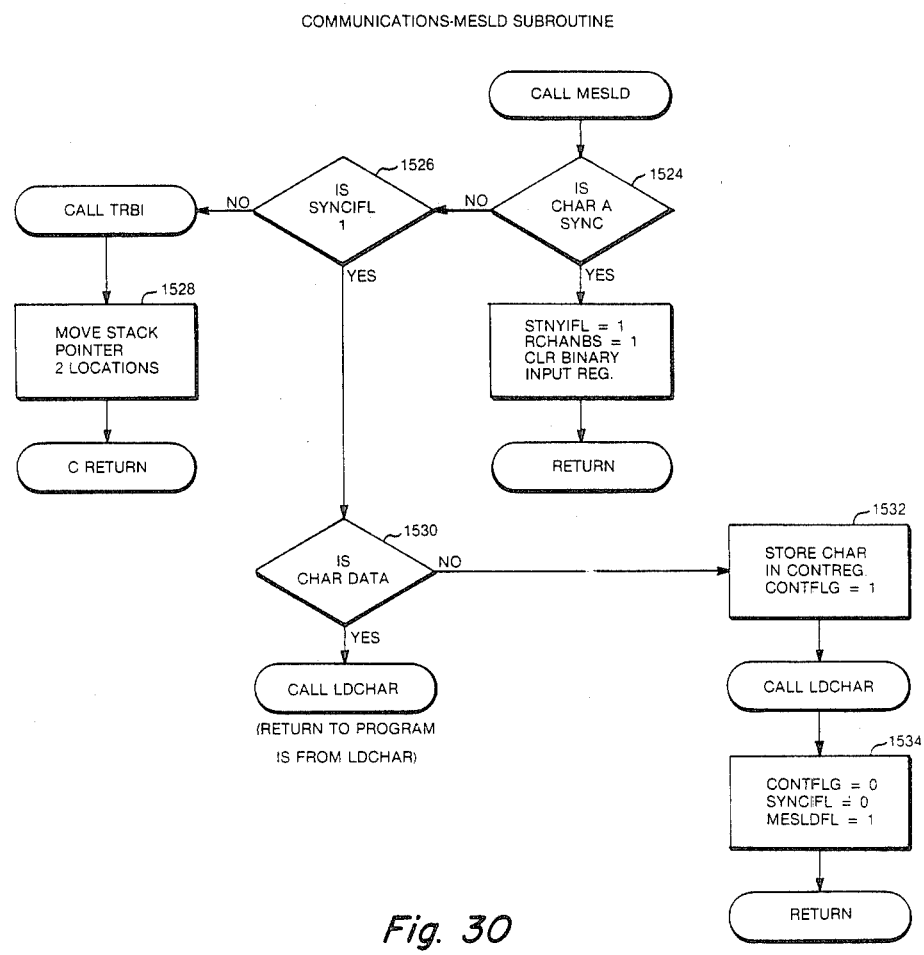
FIG. 30 is the flow chart of the MESLD subroutine.

The MESLD subroutine is shown in FIG. 30. First, a test as to whether a SYNC character has been received is made in block 1524. If it has not, the variable SYNCIFL is tested for a value of 1 block 1526. If it is not equal to 1, the TBR 1 program is called. Upon return therefrom, the stack pointer is moved two locations according to block 1528. Thereafter, the program moves to the CRETURN subroutine. If the SYNCIFL character is equal to 1, the function of block 1530 determines whether or not the character is data. If it is data, the LDCHAR program is called. If it is not data, the character is stored in the CONTREG variable, and the CONTFLG variable is set to 1, according to block 1532. Next, the LDCHAR subroutine is called. Thereafter, the CONTFLG variable and the SYNCIFL variables are set to a value of 0; as well, the MESLDFL variable is set to 1 in block 1534. Thereafter, the program returns.

Figure 31:
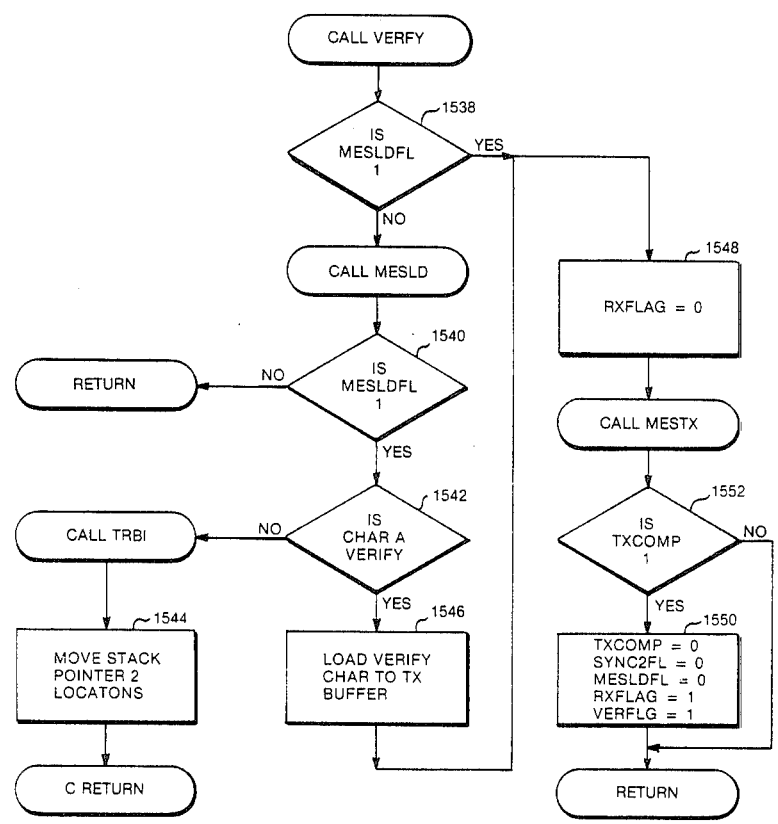
FIG. 31 is the flow chart of the VERFY subroutine.

The VERIFY subroutine is shown now in FIG. 31. First, in block 1538 the variable MESLDFL is compared to a value of 1. If it is not equal, the MESLD program is called. Next, the MESLDFL variable is again tested for a value of 1 in block 1540. If it is not equal to 1, the program goes to return. If it is equal to 1 at this point, the character is tested for a verify character in block 1542. If it is not, the TBR 1 program is called. Next, in block 1544 the stack pointer is moved 2 locations; thereafter, the program moves to the CRETURN subroutine. If, in block 1540 the MESLDFL variable is 1 and the character is a verify character according to the decision in block 1542, the verify character is loaded into the transmit buffer according to block 1546. Thereafter, or if after block 1538 the MESLDFL variable is equal to 1, the program sets the RXFLAG variable to 0 in block 1548. Next, the MESTX program is called. Thereafter, upon return, the variable TXCOMP is tested for a value of 1 according to block 1552; if equal to 1, the variables TXCOMP, SYNC 2FL, and MESLDFL are set to a value of 0. Also, the RXFLAG and VERFLG variables are set to 1 in the block 1550. Thereafter, or if in block 1552 above the TXCOMP is not equal to 1, the program then returns to the program from which it was called.

Figure 32:
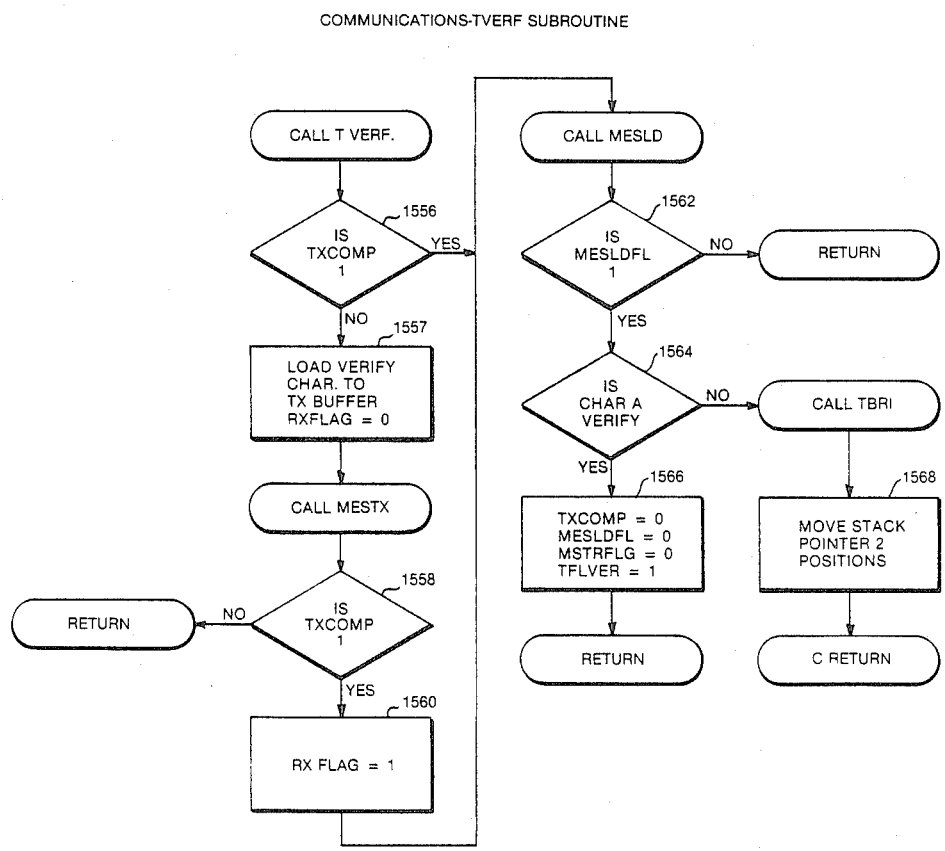
FIG. 32 is the flow chart of the TVERF subroutine.

The TVERF subroutine is shown in FIG. 32. First, the TXCOMP variable is evaluated in block 1556. If the TXCOMP variable is equal to 1, the MESLD subroutine is called; if TXCOMP equals zero, the verify character is loaded into the transmit buffer and the receive flex (RXFLAG) is set to zero at block 1557, after which the MESTX subroutine is called. At block 1558, the TXCOMP variable is again tested for a 2 value, whereupon the subroutine goes back to CRETURN. If TXCOMP is equal to zero, the receive flag (RXFLAG) is set to one (1) at block 1560, and thereafter the MESLD subroutine called. Thereafter, the MESCDFL variable is tested for a 1 value at block 1562; and causes the subroutine to go back to CRETURN if equal to 1. Otherwise, the received character is checked for a verify character of block 1564. If the character is a verify character, the TXCOMP, MSLDFL, and MSTRFLG variables are set to zero, the TFLVER variable is set to one (1) at block 1566; thereafter, the subroutine goes back to CRETURN. If the character at block 1564 is not a verify character, the TBR1 subroutine is called, and the stack pointer is moved two (2) positions at block 1568. The subroutine is complete and goes to CRETURN.

The TBR subroutines are shown in FIGS. 33, 34 and 35. The TBR 1A program is entered upon a receive error, such as a parity error. In FIG. 33, block 1572, the communications port variable, COM 1, is set to 0. At 1513 the TBR 1 program begins. Thereafter, the following variables in block 1574 are set. The TBRT 3ST and the TBRFLG variables are set to 1; the TBRT 3CT and the TBRT1ST are set to 0. Thereafter, the program returns.

The TBR 2 subroutine of FIG. 34 is entered if the TBRFLG variable equals 1 when a character is received. First, in block 1576, the variable IDLFLG is tested for a value of 1. If not equal to 1, the character is tested to be a TBRACK character according to block 1578. If it is equal to 1, the variables TBRT 1CT, TBRT 2ST, and TBRT 1ST are all set to a value of 0 according to block 1580, which is also the starting point for the TBR31 subroutine. Thereafter, the program INITCOM is called at 1581; also, this subroutine is enterable here as a TBR3 subroutine. In block 1582, the variables TBRT 1ST, TBRFLG, IDLFLG, CHANBSY, and TXDISC are set to a value of 1. Next, in block 1584 the variable COMREG is set to 1, and the character TBRACK is transmitted. Thereafter, the program returns. However, if in block 1576 the variable IDLFLG is equal to 1, the character is tested for idle status in block 1586. If it is equal to idle, the INITCOM program (not shown) is called. Upon return, the TXFLAG variable is tested for a value of 1 in block 1588. If it is not equal to 1, or if the character is not a TBRACK as decided in block 1578, the program will then return. Next, in block 1590, the IDLFLG, TBRFLG, TBRT 1ST, and the TBRT 2ST are all set to a value of 0. Thereafter, the program moves to the receive subroutine, discussed above. If the variable TXFLAG is equal to 1 in block 1588, the transmit buffer pointers are initialized according to block 1592. Thereafter, the program moves to the request subroutine.

The TBR 4 subroutine shown in FIG. 35 first decrements the TBRCTR variable according to block 1594. Next, the TRBCTR variable is compared to 0 in block 1596. If it is not equal to 0, the variable TBRT 2CT is set to 0, and the TBRCTR is transmitted according to block 1598. Thereafter, the program returns. However, if in block 1596 the TBRCTR variable is equal to 0, the variable COMERR is moved to the receive buffer, RXBUFRC; and the variables MESPEND, TBRFLG, and variable TBRT 2ST are set to values of 1, 0, and 0, respectively, according to block 1600. Thereafter,-the program returns.

It will be appreciated that modifications to the preferred embodiment of the present invention described herein may be made by those of ordinary skill in the art without departing from the intended scope of the invention. Therefore, the invention is to be construed only in accordance with the appended claims and is not to be limited by the above description of a preferred embodiment.

What is claimed is:

1. A press brake controller for producing a control signal to control the travel of the ram of a press brake, said controller including:
   means for providing a specified ram position signal corresponding to a predetermined bend parameter;
   a ram encoder connected to said ram for providing an actual ram position signal;
   a ram signal comparator forming a ram error signal corresponding to the difference between said ram location signal and said ram position signal; and
   a ram signal compensator forming said control signal corresponding to the averaged sum of said ram position signal and said ram error signal.

2. The press brake controller of claim 1 for performing a sequence of bends, said controller further comprising:
   means for providing a sequence of ram position signals each corresponding to each of said bend; and
   a step increment means connected to increment said means for providing a sequence of ram position signals to provide the next said ram position signal.

3. The press brake controller of claim 2 further including:
   means to display said position dimension value; and
   means to receive prerecorded position dimension value.

4. A press brake controller for producing a control signal to control the ram of a press brake, said press brake controller enabling said press brake to repetitively perform a bend having a predetermined dimension value corresponding to a bend angle, each bend being initiated according to a ram control switch, said controller including:
   means for providing an averaged ram position signal corresponding to said predetermined dimension value;
   a ram encoder connected to said ram providing a ram location signal;
   a ram signal comparator forming a ram error signal corresponding to the difference between each said location signal and said ram position signal;
   a ram error averager receiving said ram error signal and forming a ram average error signal corresponding to the average of a plurality of each said ram error signals, said plurality of ram error signals including ram error signals from a prior bend; and
   a ram signal compensator forming a control signal corresponding to the sum of said ram position signal and said ram average error signal.

5. The press brake control system of claims 1 or 4 further including safety alarm means comprising alarm position measurement means connected to said ram for producing an alarm position signal corresponding to said ram position;

absolute position limit detection means for providing an alarm output signal when said alarm position signal exceeds a predetermined absolute position; and adjustable position limit detection means for providing an alarm output signal when said alarm position signal exceeds a predetermined adjustable ram position signal;

wherein said safety alarm means is independently operable from said ram signal comparator.

6. Means for data communication between a first processor system and a second processor system comprising:

a communication channel interconnecting said first and second processor systems;

message transmission means within said first processor system for providing a message signal to said transmission channel;

message echo means within said second processor system for subsequently retransmitting said message signal on said transmission channel from the received said message signal;

means to compare the message signal retransmitted by the second processor system with the message signal transmitted by the first processor system;

message verify means within said first processor system for subsequently providing a verify signal on said communication channel upon correct receipt of said message signal after retransmission on said transmission line;

verify echo means within said second processor system for subsequently retransmitting said verify signal on said communication channel as received by said verify echo means; and means to indicate the equality of the message and the message echo signals, and the message verify and the echo verify signals.

7. The means of claim 6 further comprising:

channel request means within said first processor system for providing a channel request signal to said communication channel;

channel acknowledgement transmission means within said second processor system for providing an acknowledgement signal to said communication channel after receipt of said channel request signal; and channel acknowledgement receiver means within said first system to enable said message transmission means to provide said message signal after receipt of said acknowledgement signal.

8. The means of claim 6, wherein said communication channel is a serial communication channel.

9. The means of claim 8, wherein said serial communication channel is operable in accordance with RS-232 signal format standards.

10. A method of data communication between a first processor and a second processor system comprising the steps of:

sending a message signal from the first processor to be received by the second processor;

sending a message echo from the second processor to be received by the first processor;

comparing the message echo received by the first processor with the message signal sent by the first processor;

sending a verify signal from the first processor to be received by the second processor;

sending a verify echo signal from said second processor to be received by the first processor; and indicating the receipt of said verify echo signal, wherein the message signal is retransmitted if the message echo signal differs from the message signal, and said verify signal is retransmitted if the verify echo signal does not correspond thereto.

11. The method of claim 10 further comprising the steps of:

requesting the data communications channel by said first processor; and acknowledging the request for said channel by sending an acknowledge signal from said second processor to said first processor, wherein the receipt of said acknowledge signal enables said first processor to initiate the step of sending a message signal.

12. The method of claim 10, including the steps of:

detecting an interference condition when a non-recognizable signal is received by both said first processor and said second processor;

sending from said first processor a status check signal, to be received by said second processor; and acknowledging said status check signal by transmitting an acknowledge signal from said second processor to said first processor, wherein the receipt of said acknowledge signal triggers the transmission of either an idle signal or a message signal from the first processor to the second processor.

13. The method of claim 12 wherein the first processor transmitted an idle signal, further including the steps of:

sending an idle signal from said second processor to said first processor following receipt of said idle signal.

14. The method of claim 12 wherein the first processor transmitted an idle signal, further including the step of:

sending a message signal from said second processor to said first processor following receipt of said idle signal.

15. A digital multiplier receiving sine and cosine incremented encoders signals, each said sine and cosine signal having a periodicity, said multiplier comprising:

direction detection means for producing a direction output signal;

transition detection means for receiving said sine and cosine signals producing a rate output signal having a periodicity at a multiple of said sine and cosine signal periodicity;

clock means for providing periodic clock pulses; and inhibit means for detecting a first transition of said sine and cosine signals after said clock pulse, wherein said inhibit means operates for inhibiting said transition detection when said sine and cosine signals make a transition before the subsequent clock pulse.

16. A digital multiplier receiving sine and cosine incremental encoders signals, each said sine and cosine signal having a periodicity, said multiplier comprising:

direction detection means for receiving said sine and cosine signals and for producing a direction output;

transition detection means for receiving said sine and cosine signals and for producing a rate output signal having a periodicity at a multiple of said sine and cosine signal periodicity;

clock means for providing periodic clock pulses; and inhibit means to inhibit said rate output signal when transitions from a first state to a second state to said first state occur within one of said clock periods.

17. The digital multiplier of claims 15 or 16 wherein the rate output signal of said transition detection means has a duration of one clock period.

18. The digital multiplier of claim 17 wherein said transition detection means comprises:
   first positive differentation means for receiving the sine signal to produce an output signal after a rising pulse edge of the sine signal;
   first negative differentiation means for receiving the sine signal to produce an output signal after a falling edge of the sine signal;
   second positive differentiation means for receiving the cosine signal to produce an output signal after a rising edge of the cosine input; and
   second negative differentiation means for receiving the cosine signal to produce an output signal after a falling edge of the cosine signal;
   wherein said first positive and negative differentiation means are interconnected and said second positive and negative differentiation means are interconnected to inhibit one of the respective positive and negative differentiation means until the other of said positive and negative differentiation means has completed its output signal.

19. A press brake controller for producing a control signal to control the travel of the ram of a press brake, said controller including:
   means for providing a specified ram position signal corresponding to a predetermined bend parameter;
   a ram encoder connected to said ram providing an actual ram position signal;
   a ram signal comparator forming a ram error signal corresponding to the difference between said ram location signal and said ram position signal; and
   a ram signal compensator forming said control signal corresponding to the averaged sum of said ram position signal and said ram error signal, wherein said ram encoder comprises:
   incremental encoder means connected to the press brake for providing sine and cosine pulse output pulse signals each having a pulse rate corresponding to the velocity of the attached press brake element motions;
   digital multiplier means including:
   direction detection means for producing a direction output;
   transition detection means for receiving said sine and cosine output signals and for producing a rate output at a multiple of said incremental encoder pulse rate;
   clock means for providing periodic clock pulses; and
   inhibit means for inhibiting said transition detection means rate output signal transition when one of said sine and cosine input signals has a duration of less than one clock pulse period, wherein said direction output and said rate output taken together form said ram position signal.

20. The press brake controller of claim 19, wherein the controller further comprises:
   a first processor receiving at least one of said direction output and said rate output;
   a second processor; and
   data communication means connected to transmit data between said first processor and said second processor.

21. The press brake controller of claim 20, wherein said data communication means comprises:
   a communication channel interconnecting said first and said second processors, and said controller further comprising:
   message transmission means within said first processor for providing a message signal to said transmission channel;
   message echo means within said second processor for subsequently providing a message echo signal on said communication channel from the received said message signal;
   signal comparison means for receiving a message signal and an echo signal, and for providing an output signal when identical;
   message verify means within said first processor system for subsequently providing a verify signal on said communication channel upon output of said signal comparison means;
   verify echo means within said second processor system for subsequently retransmitting said verify signal on said communication channel; and
   means to indicate the equality of the verify signals and verify echo signals.

22. The press brake control system of claim 21 wherein the first processor is a display unit and the second processor is a main control unit.

23. The press brake control system of claim 22 wherein a ram control signal is produced to produce a corresponding punch excursion distance for a predetermined bend angle determined by calculating the following equation:

$$d = (Rd + Rp + t)(1 - \cos\alpha) + [w/2 - (Rd + Rp + t)\sin\alpha]\tan\alpha$$

where d is the punch excursion distance, $\cos\alpha$ is the cosine of the tilt angle, $\sin\alpha$ is the sine of the tilt angle, Rd is the die corner radius, Rp is the punch nose radius, t is the material thickness, and w is the die width between the die corner radii.

24. The press brake control system of claim 23 wherein the ram control signal includes a springback correction signal determined by calculating the following equation:

$$\Delta\alpha = \alpha' K/(1-K)$$

where K is a variable determined by calculating the equation $$K = \frac{3\sigma}{E}(1 - \gamma^2)\frac{Rp}{t}$$

and where $\sigma$ is the yield strength, $\gamma$ is Poisson's ratio, $\alpha'$ is the tilt angle after springback, E is the elastic modulus, and $\Delta\alpha$ is the springback correction.

25. A press brake controller for producing a control signal to control the ram of a press brake, said press brake controller enabling said press brake to repetitively perform a bend having a predetermined dimension value corresponding to a bend angle, each bend being initiated according to a ram control switch, said controller including:
   a ram position specifier providing an averaged ram position signal corresponding to said predetermined dimension value;

a ram encoder connected to said ram providing a ram location signal;

a ram signal comparator forming a ram error signal corresponding to the difference between each said location signal and said ram position signal;

a ram error averager receiving said ram error signal and forming a ram average error signal corresponding to the average of a plurality of each said ram error signals, said plurality of ram error signals including ram error signals from a prior bend; and a ram signal compensator forming a control signal corresponding to the sum of said ram position signal and said ram average error signal, wherein said ram encoder comprises:

incremental encoder means connected to the press brake providing sine and cosine pulse output pulse signals each having a pulse rate corresponding to the velocity of the attached press brake element motions;

digital multiplier means including:

direction detection means producing a direction output;

transition detection means receiving said sine and cosine output signal producing a rate output at a multiple of said incremental encoder pulse rate;

clock means providing periodic clock pulses; and inhibit means to inhibit said transition detection means rate output signal transition when one of said sine and cosine input signals has a duration of less than one clock pulse period, wherein said direction output and said transition rate output taken together form said ram position signal.

* * * * *